US012649409B2

(12) United States Patent
Shimotani et al.

(10) Patent No.: US 12,649,409 B2
(45) Date of Patent: Jun. 9, 2026

(54) LIGHT DISTRIBUTION CONTROL DEVICE, LIGHT DISTRIBUTION CONTROL SYSTEM, AND LIGHT DISTRIBUTION CONTROL METHOD

(71) Applicant: Mitsubishi Electric Mobility Corporation, Tokyo (JP)

(72) Inventors: Mitsuo Shimotani, Tokyo (JP); Satoru Inoue, Tokyo (JP); Yoshitaka Onishi, Tokyo (JP); Hiroki Nakamoto, Tokyo (JP)

(73) Assignee: MITSUBISHI ELECTRIC MOBILITY CORPORATION, Tokyo (JP)

( * ) Notice: Subject to any disclaimer, the term of this patent is extended or adjusted under 35 U.S.C. 154(b) by 140 days.

(21) Appl. No.: 18/729,795

(22) PCT Filed: Mar. 3, 2022

(86) PCT No.: PCT/JP2022/009041
§ 371 (c)(1),
(2) Date: Jul. 17, 2024

(87) PCT Pub. No.: WO2023/166644
PCT Pub. Date: Sep. 7, 2023

(65) Prior Publication Data
US 2025/0135988 A1    May 1, 2025

(51) Int. Cl.
*B60Q 1/08* (2006.01)
*B60Q 1/00* (2006.01)

(52) U.S. Cl.
CPC .......... *B60Q 1/085* (2013.01); *B60Q 1/0076* (2013.01); *B60Q 2300/21* (2013.01); *B60Q 2300/23* (2013.01)

(58) Field of Classification Search
CPC .... B60Q 1/143; B60Q 2300/42; B60Q 1/085; B60Q 2300/41; B60Q 2300/056;
(Continued)

(56) References Cited

U.S. PATENT DOCUMENTS

| 2022/0315013 A1* | 10/2022 | Ben Abdelaziz | .... G06V 20/597 |
| 2024/0294115 A1* | 9/2024 | Komatsu | .................. B60R 1/28 |
| 2024/0416718 A1* | 12/2024 | Schroeter | ............ B60H 1/0075 |

FOREIGN PATENT DOCUMENTS

| JP | 2012-171485 A | 9/2012 |
| JP | 2014-12494 A | 1/2014 |
| JP | 2020-181310 A | 11/2020 |

OTHER PUBLICATIONS

International Search Report for PCT/JP2022/009041 (PCT/ISA/210) mailed on Apr. 19, 2022.

* cited by examiner

*Primary Examiner* — Wei (Victor) Y Chan
(74) *Attorney, Agent, or Firm* — Birch, Stewart, Kolasch & Birch, LLP

(57) ABSTRACT

A light distribution control device includes processing circuitry configured to receive environment information indicating an environment in which a host vehicle is placed; receive an instruction from a driver of the host vehicle to switch an irradiation lamp of the host vehicle; perform estimation of whether or not the driver has an intention to switch the irradiation lamp on a basis of an action of the driver; switch the irradiation lamp of the host vehicle on a basis of the environment information; and learn a driving scene in which the irradiation lamp of the host vehicle is to be switched by using the received environment information at a second time point at which the intention is estimated to be present, the second time point being prior to a first time point at which the instruction is received.

19 Claims, 20 Drawing Sheets

(58) Field of Classification Search
CPC .......... B60Q 2300/322; B60Q 2300/45; B60Q
1/08; B60Q 9/008; B60Q 1/0023; B60Q
2300/312
See application file for complete search history.

t0: Time Point at Which Illuminance E Starts to Become Dark t2: Time Point at Which Driver US Performs Action of Looking Far (Time Point of Having Switching Intention KI)

t1: Time Point at Which Driver US Has Performed Switching Operation KS from Low Beam to High Beam t3: Starting Point at Which Illuminance E Has Settled to Lowest Level t0: Time Point at Which Illuminance E Starts to Become Bright t2: Time Point at Which Driver US Has Performed Action as if Being Dazzled (Time Point of Having Switching Intention KI)

t1: Time Point at Which Driver US Has Performed Switching Operation KS from High Beam to Low Beam t3: Starting Point at Which Illuminance E Has Settled to Highest Level

FIG. 8

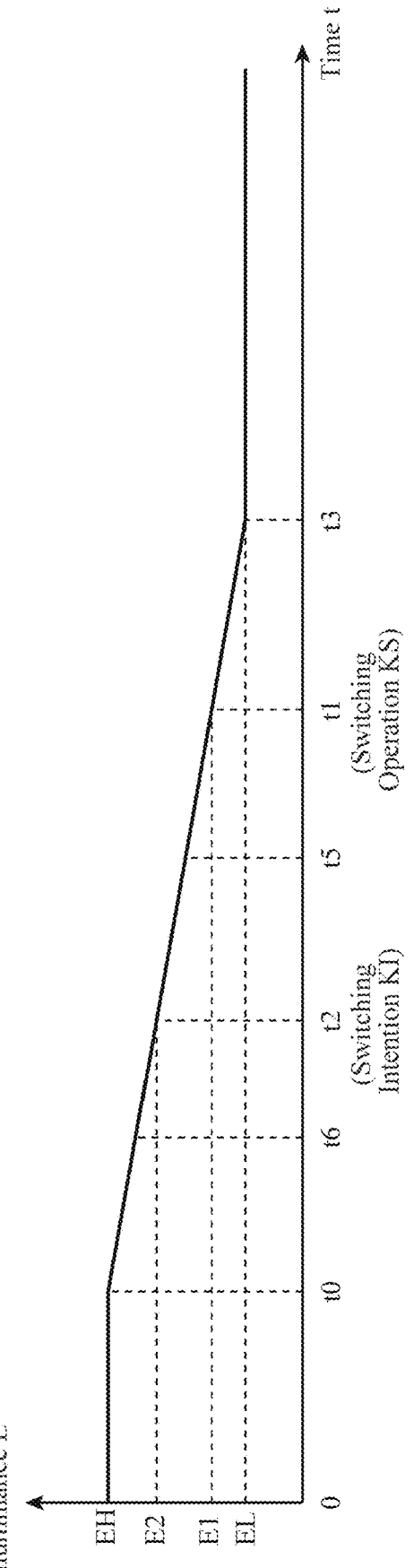

t0: Time Point at Which Illuminance E Starts to Become Dark t2: Time Point at Which Driver US Performs Action of Looking Far (Time Point of Having Switching Intention KI)

t1: Time Point at Which Driver US Has Performed Switching Operation KS from Low Beam to High Beam t3: Starting Point at Which Illuminance E Has Settled to Lowest Level t5: Time Point between t1 and t2 t6: Time Point between t2 and t0

FIG. 9

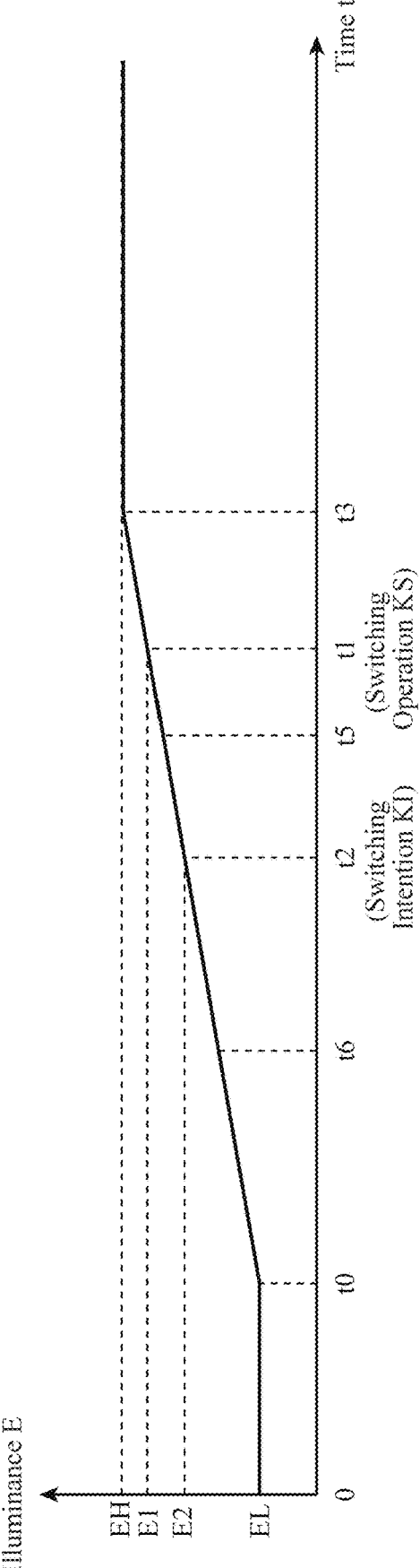

t0: Time Point at Which Illuminance E Starts to Become Bright t2: Time Point at Which Driver US Has Performed Action as if Being Dazzled (Time Point of Having Switching Intention KI)

t1: Time Point at Which Driver US Has Performed Switching Operation KS from High Beam to Low Beam t3: Starting Point at Which Illuminance E Has Settled to Highest Level t5: Time Point between t1 and t2 t6: Time Point between t2 and t0 t0: Time Point at Which Illuminance E Starts to Become Dark t2: Time Point at Which Driver US Performs Action of Looking Far (Time Point of Having Switching Intention KI)

t1: Time Point at Which Driver US Has Performed Switching Operation KS from Low Beam to High Beam t2a to t2e: Time Point at Which Driver US has Switching Intention KI t1: Time Point at Which Driver US Has Performed Switching Operation KS Eth: Illuminance Having Decreased by dE from EH t2a to t2e: Time Point at Which Driver US has Switching Intention KI t1: Time Point at Which Driver US Has Performed Switching Operation KS tTH: Time Point Going Back by Time T2 from t1

Recognition: Driver US Feels Dark

Self-control: Driver US Squints His/Her Eyes or Like

Operation: Driver US Releases His/
Her Hand from Steering Wheel and Operates Lever of Irradiation Lamp ST

START

Capture Image GZ ───ST31

Collect Plurality of Images GZ ───ST32

Divide Image GZ into Areas ER ───ST33

Calculate Brightness in Area ER ───ST34

Average Processing of Brightness (Using Vehicle Speed SV) ───ST35

Generate Brightness Index MS ───ST36

END

Image GZ

Area ER(B3)

Area ER(B2)

Area ER(CL)     Area ER(B1)     Area ER(CR)

Area ER(A)

LIGHT DISTRIBUTION CONTROL DEVICE, LIGHT DISTRIBUTION CONTROL SYSTEM, AND LIGHT DISTRIBUTION CONTROL METHOD

TECHNICAL FIELD

The present disclosure relates to a light distribution control device, a light distribution control system, and a light distribution control method.

BACKGROUND ART

A vehicle illumination control system described in Patent Literature 1, which is common to a light distribution control device according to the present disclosure in terms of controlling illumination of an illumination device of a vehicle, stores a driving scene in which the driver manually turns on the illumination device in addition to, for example, switching the illumination device on the basis of a driving scene set in advance as an initial setting so as to correspond to a driving scene observed by the driver, and thereafter switches the illumination device using the driving scene in which the driver manually turns on the illumination device.

CITATION LIST

Patent Literature

Patent Literature 1: JP 2020-181310 A

SUMMARY OF INVENTION

Technical Problem

However, in many cases, the time point at which the driver manually switches the illumination device is not a time point at which the driver feels that the driver wants to switch the illumination device, but is a time point at which the driver feels that it is difficult to travel without switching the illumination device and takes an action after continuing to travel without switching the illumination device while feeling that the driver wants to switch the illumination device. Therefore, there is a problem that it is not appropriate for the driver even if the above-described vehicle lighting control system performs switching control of the illumination device on the basis of the driving scene at the time when the driver manually switches the illumination device.

An object of the present disclosure relates to a light distribution control device, a light distribution control system, and a light distribution control method capable of performing switching control that avoids a situation where a driver travels in a situation where a field of view is not appropriate for the driver and does not impose stress on the driver.

Solution to Problem

In order to solve the above problem, a light distribution control device according to the present disclosure includes processing circuitry configured to receive environment information indicating an environment in which a host vehicle is placed; receive an instruction from a driver of the host vehicle to switch an irradiation lamp of the host vehicle; perform estimation of whether or not the driver has an intention to switch the irradiation lamp on a basis of an action of the driver; switch the irradiation lamp of the host vehicle on a basis of the environment information; and learn a driving scene in which the irradiation lamp of the host vehicle is to be switched by using the received environment information at a second time point at which the intention is estimated to be present, the second time point being prior to a first time point at which the instruction is received.

Advantageous Effects of Invention

According to the light distribution control device of the present disclosure, it is possible to avoid a situation in which a driver travels in a situation where the field of view is not appropriate for the driver.

BRIEF DESCRIPTION OF DRAWINGS

FIG. 8 is a time chart illustrating operation of a light distribution control device HSD of Modification 5 of the first embodiment (part 1).

FIG. 9 is a time chart illustrating the operation of a light distribution control device HSD of Modification 5 of the first embodiment (part 2).

DESCRIPTION OF EMBODIMENTS

Figure 1:
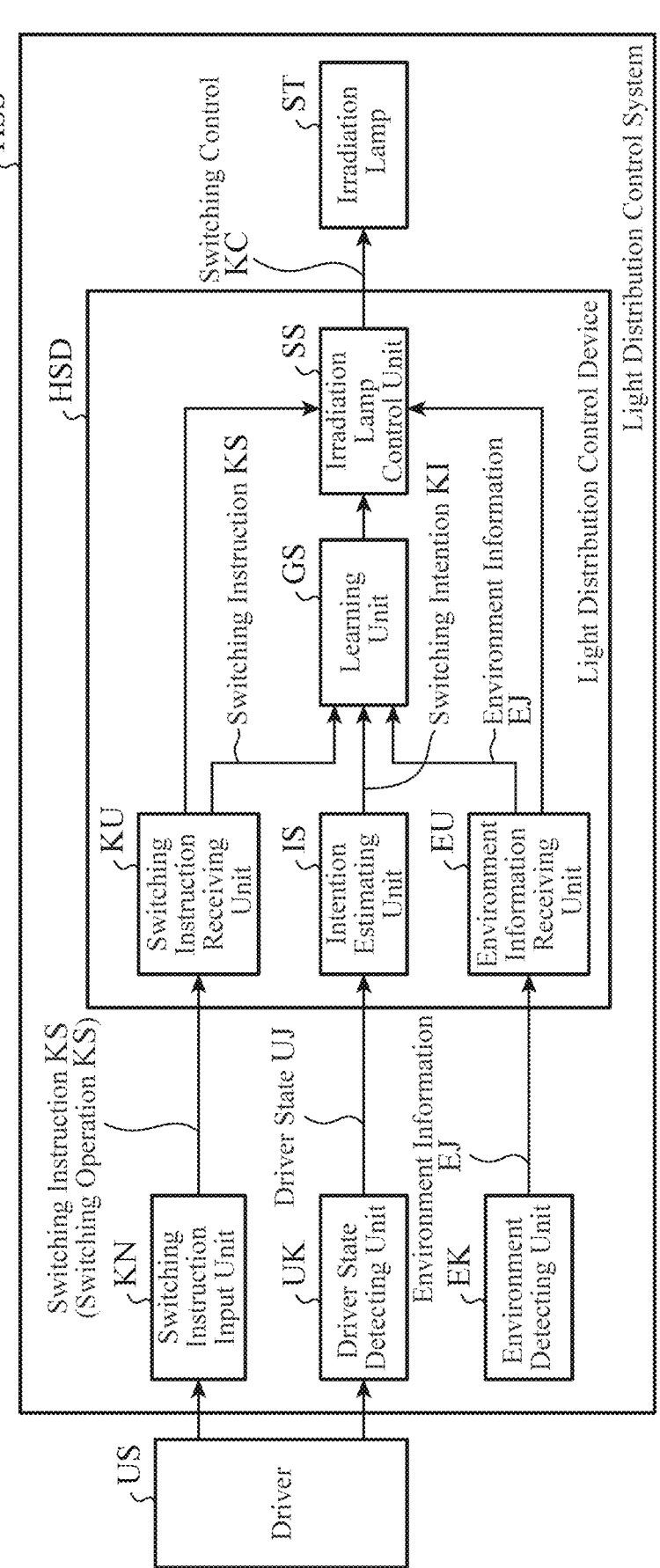
FIG. 1 is a functional block diagram of a light distribution control system HSS of a first embodiment.

Embodiments of a light distribution control device according to the present disclosure will be described.

In order to facilitate description and understanding, a plurality of names may be collectively referred to by one reference numeral, and for example, a plurality of areas ER(A), ER(B1), . . . may be collectively referred to by one reference numeral "ER".

FIRST EMBODIMENT

First Embodiment

A light distribution control device of a first embodiment will be described.

Function of First Embodiment

FIG. 1 is a functional block diagram of a light distribution control system HSS of the first embodiment.

As illustrated in FIG. 1, the light distribution control device HSD of the first embodiment includes a switching instruction receiving unit KU, an intention estimating unit IS, an environment information receiving unit EU, a learning unit GS, and an irradiation lamp control unit SS in order to control switching (for example, switching between a low beam and a high beam, and switching between turning on and off) of an irradiation lamp ST.

The environment information receiving unit EU corresponds to an "environment information receiving unit", the switching instruction receiving unit KU corresponds to a "switching instruction receiving unit", the intention estimating unit IS corresponds to an "intention estimating unit", the learning unit GS corresponds to a "learning unit", and the irradiation lamp control unit SS corresponds to an "irradiation lamp control unit".

As illustrated in FIG. 1, the light distribution control system HSS includes the light distribution control device HSD, the irradiation lamp ST, a switching instruction input unit KN, a driver state detecting unit UK, and an environment detecting unit EK.

The switching instruction input unit KN is used by a driver US of a host vehicle JS (not illustrated) to switch the irradiation lamp ST. The switching instruction input unit KN is, for example, a lever switch for switching between the low beam and the high beam.

The driver state detecting unit UK detects a state of the driver US, for example, an action of the driver US (a line of sight, a face direction, and an expression including the degree of opening of eyes, and the like). The driver state detecting unit UK is, for example, an interior camera directed toward the interior of the vehicle.

The environment detecting unit EK detects an environment in which the host vehicle JS is placed, for example, illuminance at the position of the host vehicle JS and information in front of the host vehicle JS. The environment detecting unit EK is, for example, an illuminance sensor, a front camera that images the front, or the like.

The irradiation lamp ST is, for example, a headlight. The headlight is a headlight that illuminates in front of the host vehicle, and includes an auxiliary light that illuminates any area.

Figure 2:
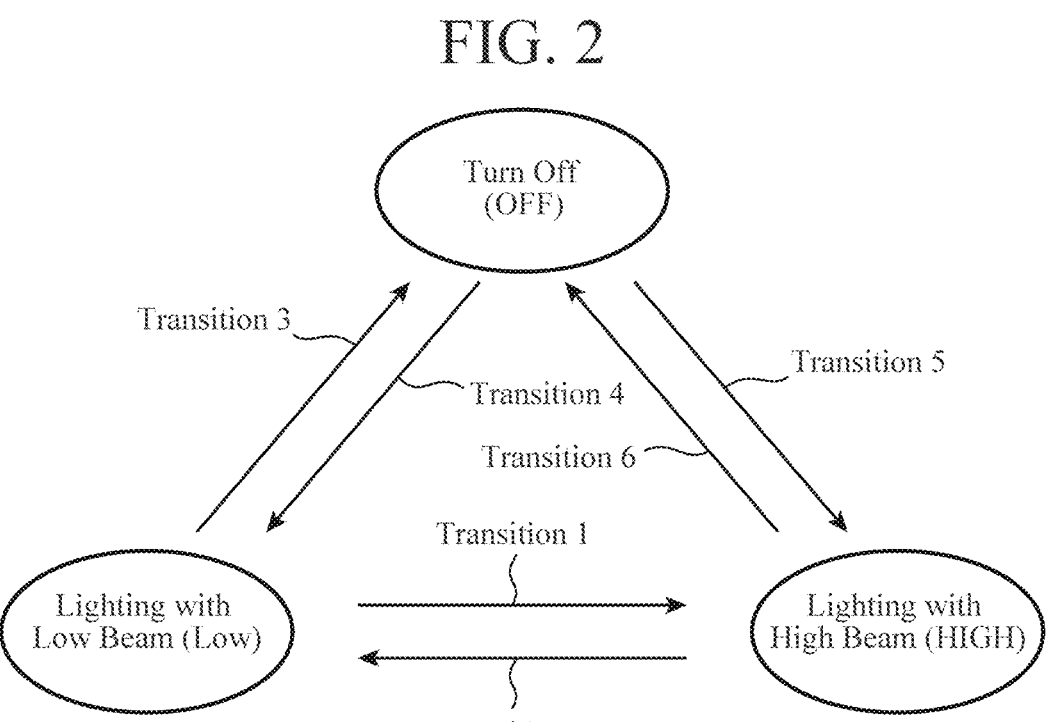
FIG. 2 is a state transition diagram of an irradiation lamp ST of the first embodiment.

FIG. 2 is a state transition diagram of the irradiation lamp ST of the first embodiment.

As illustrated in FIG. 2, the irradiation lamp ST makes a transition (for example, transition 1 and transition 2) among three states of turn-off (OFF), lighting with a low beam (LOW), and lighting with a high beam (HIGH).

Hereinafter, in order to facilitate description and understanding, transition (transition 1 and transition 2) between both states of lighting with the low beam (LOW) and lighting with the high beam (HIGH) will be mainly described.

The switching instruction receiving unit KU receives an instruction of the irradiation lamp ST by the driver US from the switching instruction input unit KN, that is, a switching instruction KS (hereinafter, it is also referred to as the "switching operation KS").

The intention estimating unit IS estimates whether or not the driver US has an intention to switch the irradiation lamp ST on the basis of a driver state UJ, which is the state of the driver US detected by the driver state detecting unit UK, for example, on the basis of the action indicated by the driver US when the driver US has a sense of incongruity in illuminance at the position where the host vehicle JS is placed.

The environment information receiving unit EU receives the environment in which the host vehicle JS detected by the environment detecting unit EK is placed, that is, the environment information EJ, for example, the illuminance at the position of the host vehicle JS.

The learning unit GS learns an illumination switching control model (also referred to as a switching condition) using the environment information EJ when the intention estimating unit IS estimates that there is an intention of the driver US to switch the irradiation lamp ST.

The irradiation lamp control unit SS controls the switching of the irradiation lamp ST on the basis of the environment information EJ by the illumination switching control model learned by the learning unit GS.

Figure 3:
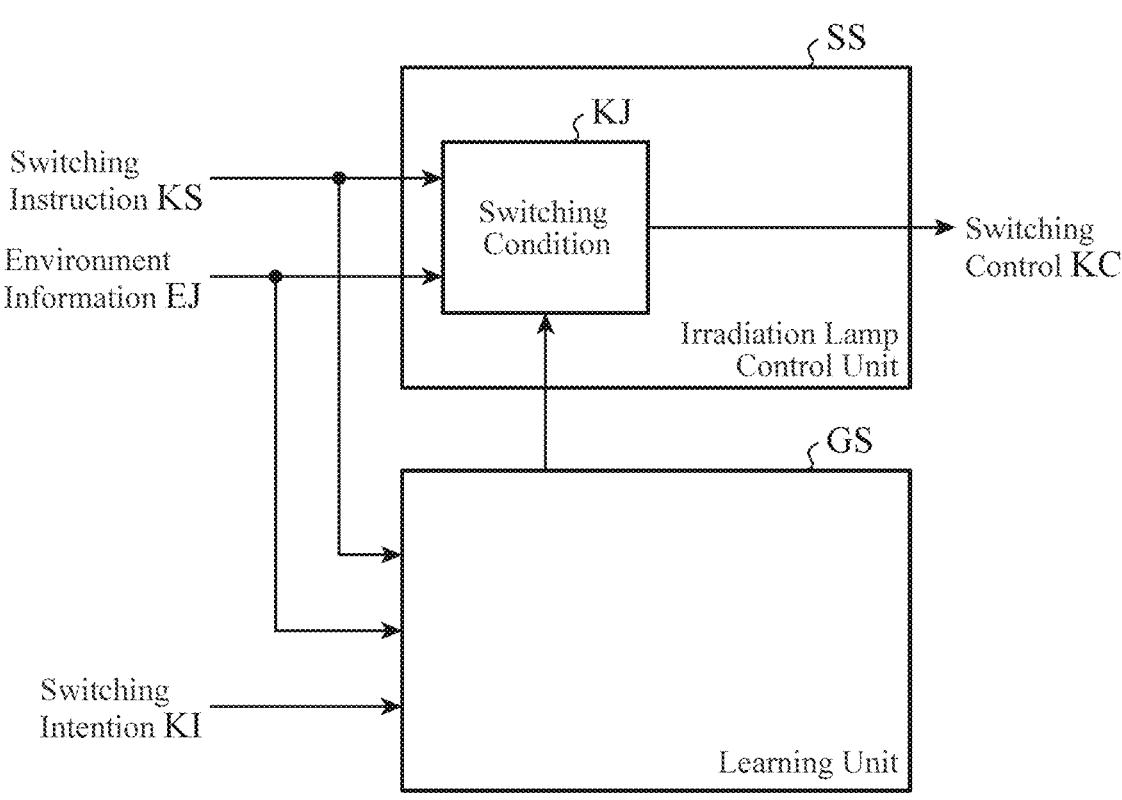
FIG. 3 illustrates schematic operations of a learning unit GS and an irradiation lamp control unit SS of the first embodiment.

FIG. 3 illustrates schematic operations of the learning unit GS and the irradiation lamp control unit SS of the first embodiment.

The learning unit GS and the irradiation lamp control unit SS perform the following operations under a switching condition KJ.

The learning unit GS and the irradiation lamp control unit SS are originally configured in such a manner that the illuminance of the environment indicated by the environment information EJ received by the environment information receiving unit EU, for example, the position where the host vehicle JS is placed becomes lower than a predetermined illuminance (for example, illuminance set at the time of shipping a new car from a factory. For example, illuminance EL to be described later), the switching control KC switches from the lighting with the low beam (LOW) to the lighting with the high beam (HIGH). This is based on, for example, an automatic illumination switching control model stored in the learning unit GS at the time of factory shipment.

When receiving the switching instruction KS of the irradiation lamp ST from the driver US prior to the switching by the illumination switching control model, the learning unit GS and the irradiation lamp control unit SS switch the irradiation lamp ST from the lighting of the low beam (LOW) to the lighting of the high beam (HIGH) by the switching control KC. This means that the driver US is dissatisfied with the illumination switching control model stored in the learning unit GS and manually switches the lighting state.

When it is estimated that there is an intention KI of switching the irradiation lamp ST in the driver US prior to the switching by the driver US, the learning unit GS and the irradiation lamp control unit SS learn the illumination switching control model in such a manner as to switch the irradiation lamp ST from the lighting of the low beam (LOW) to the lighting of the high beam (HIGH) by the switching control KC. This corresponds to the fact that the driver US has an intention of switching before manually switching the lighting state as described above.

Specifically, the learning unit GS stores, as the switching condition KJ, the environment information EJ at a point in time before the switching instruction KS of the irradiation lamp ST by the driver US and at a point in time when it is estimated that there is a switching intention KI in the driver US, and the irradiation lamp control unit SS switches the irradiation lamp ST when the environment (illuminance or the like) in which the host vehicle JS is placed reaches the environment information EJ indicated by the stored switching condition KJ.

Hardware Configuration of First Embodiment

Figure 4:
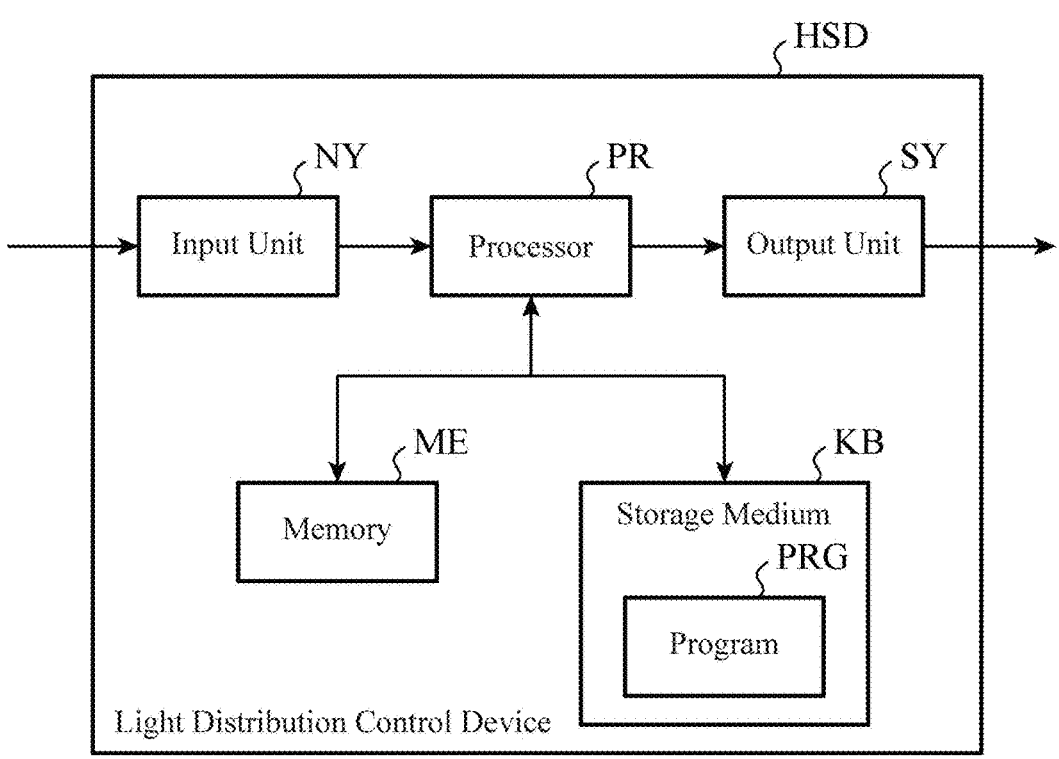
FIG. 4 illustrates a hardware configuration of a light distribution control device HSD of the first embodiment.

FIG. 4 illustrates a hardware configuration of the light distribution control device HSD of the first embodiment.

As illustrated in FIG. 4, the light distribution control device HSD of the first embodiment includes a processor PR, a memory ME, and a storage medium KB, and further includes an input unit NY and an output unit SY as necessary to perform the above-described functions.

The processor PR is the well-known core of a computer that operates hardware according to software. The memory ME includes, for example, a dynamic random access memory (DRAM) and a static random access memory (SRAM). The storage medium KB includes, for example, a hard disk drive (HDD), a solid state drive (SSD), and a read only memory (ROM). The storage medium KB stores a program PRG. The program PRG is a command group that defines contents of processing to be executed by the processor PR.

The input unit NY includes, for example, an interface as a signal input unit. The output unit SY includes, for example, an interface as a signal output unit. Regarding the relationship between the function and the hardware configuration in the light distribution control device HSD, on the hardware, the processor PR implements the functions of the respective units of the switching instruction receiving unit KU to the irradiation lamp control unit SS by executing the program PRG stored in the storage medium KB on the memory ME and controls operation of the input unit NY and the output unit SY as necessary.

Operation of First Embodiment

Figure 5:
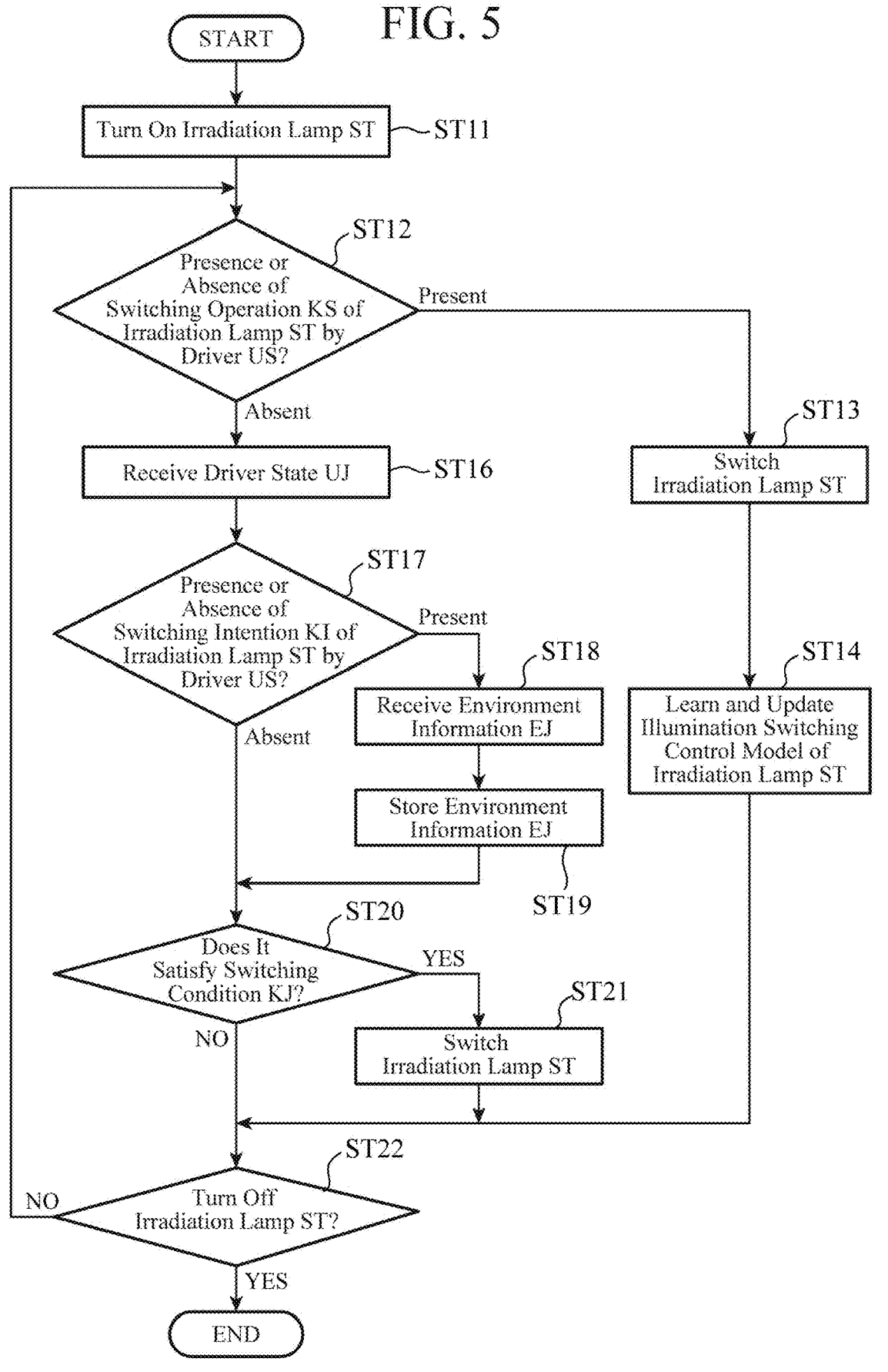
FIG. 5 is a flowchart illustrating operation of the light distribution control device HSD of the first embodiment.

FIG. 5 is a flowchart illustrating operation of the light distribution control device HSD of the first embodiment.

Figure 6:
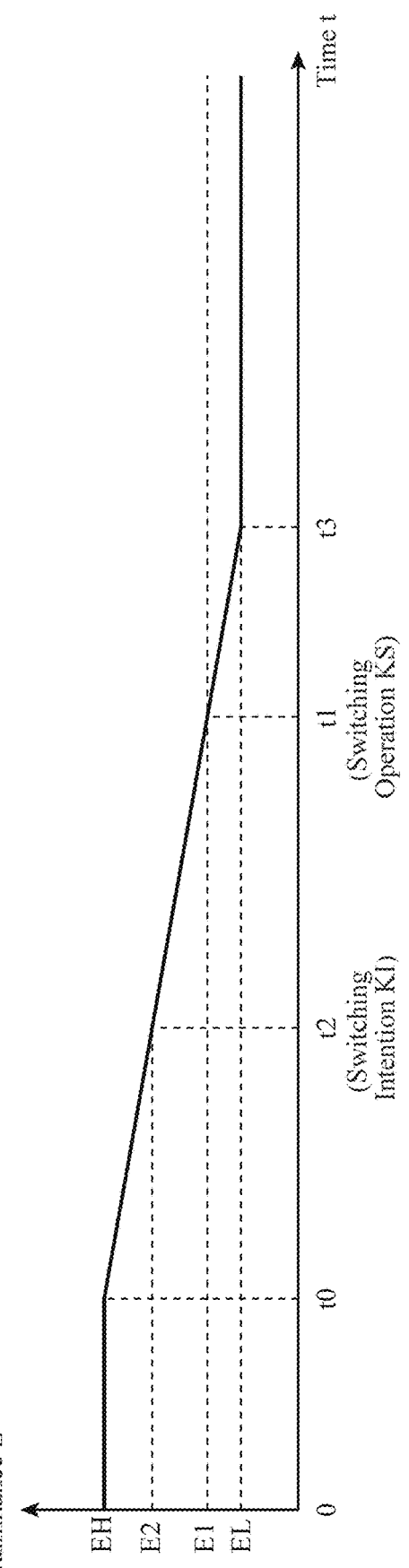
FIG. 6 is a time chart illustrating the operation of the light distribution control device HSD of the first embodiment (part 1).

FIG. 6 is a time chart illustrating the operation of the light distribution control device HSD of the first embodiment (part 1). FIG. 6 illustrates that when the driver US is driving the host vehicle JS while the irradiation lamp ST is turned on (LOW) with the low beam, the illuminance in the environment in which the host vehicle JS is placed, that is, the surroundings gradually decreases.

<Description of Operation by Illumination Switching Control Model at Factory Shipment>

Step ST11: a state is assumed in which the irradiation lamp ST continues the lighting with the low beam (LOW) in advance. Then, as illustrated in FIG. 6, it is assumed that the illuminance in the surroundings of the host vehicle JS gradually decreases from EH toward EL, that is, becomes dark.

Step ST12: in a case where the driver US is traveling with the low beam lighting (LOW) without performing the switching operation KS, the process proceeds to step ST16.

Step ST16: for example, information such as a captured image of the driver US acquired by the indoor camera is received as the driver state UJ.

Step ST17: it is determined whether or not there is a switching intention KI to switch the irradiation lamp ST on the basis of the received driver state UJ. Here, the description will be given assuming that there is no switching intention KI.

Step ST20: here, it is determined whether the switching condition KJ as an illumination switching control model is satisfied. In the illumination switching control model at the time of shipment from the factory, it is assumed that the irradiation lamp ST is switched from the lighting with the low beam (LOW) to the lighting with the high beam (HIGH) when the illuminance becomes EL or less. Here, in a case where it is time t0, since the illuminance is EH larger than EL, it is determined that the illuminance does not satisfy the switching condition KJ and lighting (LOW) with the low beam is continued.

On the other hand, if the illuminance in the surroundings of the host vehicle JS is equal to or lower than EL in step ST20, the process proceeds to step ST21 to switch from the lighting with the low beam (LOW) to the lighting with the high beam (HIGH). Although detailed description is omitted, similarly, switching from the lighting with the high beam (HIGH) to the lighting with the low beam (LOW) is also determined based on whether the illuminance satisfies the switching condition KJ, and the lighting with the high beam (HIGH) is continued or the switch to the lighting with the low beam (LOW) is performed.

If there is no instruction to turn off the irradiation lamp ST in step ST22, the process returns to step ST12.

<Switching from Lighting in High Beam (HIGH) to Lighting in Low Beam (LOW)>

Figure 7:
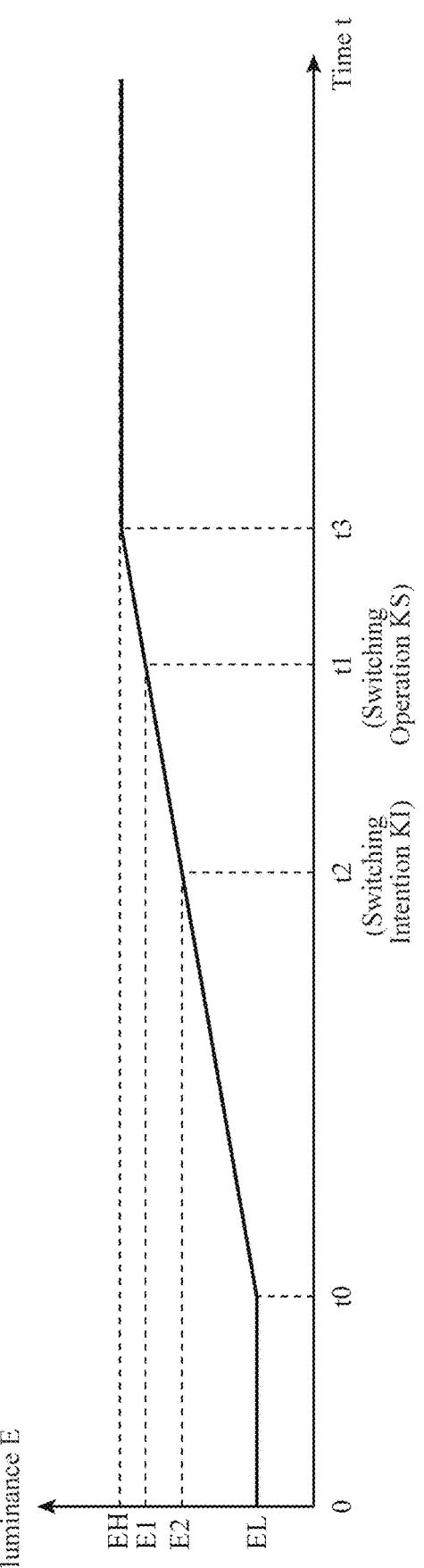
FIG. 7 is a time chart illustrating the operation of the light distribution control device HSD of the first embodiment (part 2).

FIG. 7 is a time chart illustrating operation of the light distribution control device HSD of the first embodiment (Part 2).

As is clear from the comparison between FIG. 6 and FIG. 7, when the driver US is driving the host vehicle JS with the irradiation lamp ST turned on with the high beam (HIGH) and the environment of the host vehicle JS, that is, the illuminance gradually increases, the light distribution control device HSD performs an operation (for example, the irradiation lamp ST is switched from the lighting with the high beam (HIGH) to the lighting with the low beam (LOW)) in contrast to the above-described operation by following the flowchart illustrated in FIG. 5.

<Holding Environment Information EJ at Time t2 When Driver US Indicates Switching Intention KI>

An example in which the processing returns from step ST22 to step ST12 and time t2 arrives will be described.

Step ST12: since the switching operation KS of the irradiation lamp ST has not yet been performed here, the process proceeds to step ST16. In step ST16, the driver state UJ is received in the same manner as described above.

Step ST17: here, a case will be described in which a characteristic action is observed on the driver, and it is determined that there is a switching intention KI of switching the irradiation lamp ST from the lighting with the low beam (LOW) to the lighting with the high beam (HIGH).

When the current state of the irradiation lamp ST is the lighting with the low beam (LOW), the intention estimating unit IS estimates that the driver US has a switching intention KI of switching to the lighting with the high beam (HIGH) when the driver US shows actions exemplified below, for example.

(A) When the driver US performs an action of glancing at a far side

This is because it is recognized that the driver US wants to check the state of the road surface in the far side beyond 40 m ahead of the host vehicle JS, which is an irradiation range of the low beam. The intention estimating unit IS performs estimation of whether or not the driver US is looking at a far side using, for example, at least one of actions having the same meaning as the actions exemplified below.

(A1) Whether or not the line of sight of the driver US is directed upward (A2) Whether or not the face of the driver US is facing upward (A3) Whether or not the eyelids of the driver US are opened Note that the intention estimating unit IS estimates that the driver US has a switching intention KI to lighting with the low beam (LOW) if the current state of the irradiation lamp ST is the lighting with the high beam (HIGH) and the driver US indicates actions exemplified below, for example.

(B) When the driver US performs an action of looking at a dazzling object,

This is because it is recognized that the driver US wants to avoid reflected light or the like due to reflection of the high beam on an object present in the field of view of the driver US. The intention estimating unit IS performs estimation of whether or not the driver US is dazzled using, for example, at least one of actions having the same meaning as the actions exemplified below.

(B1) Whether or not the driver US is squinting (B2) Whether or not the face of driver US is downward (B3) Whether or not the driver US squints Here, the description will be given assuming that the lighting (LOW) is being performed with the low beam and the action of (A) described above is detected at time t2.

Step ST18: the environment information receiving unit EU receives the environment information EJ at time t2 in FIG. 6, more specifically, the environment information EJ when it is estimated that there is a switching intention KI, that is, illuminance E2.

Time t2 corresponds to a "second time point".

Step ST19: the learning unit GS stores and holds the environment information EJ at time t2, that is, the illuminance E2 as the switching condition KJ, but does not learn here yet. This is because it is not clear as to whether or not the action (A) is performed as a result of holding back a feeling that the irradiation lamp ST should be adjusted to the lighting with the high beam (HIGH) or whether or not the action (A) is merely performed by chance.

After step ST19, the process proceeds to step ST20, performs the process described above, and returns to step ST12.

<Learn Illumination Switching Control Model on Basis of Environment Information EJ at Time t2 at which Driver US Issues Switching Instruction KS>

Here, an example in which the processing returns from step ST22 to step ST12 and time t1 arrives will be described. Time t1 is a time point at which the illuminance drops to E1 and the driver US can no longer hold back the above-mentioned feeling and performs the switching operation KS from the lighting with the low beam (LOW) to the lighting with the high beam (HIGH).

Step ST12: the switching instruction receiving unit KU (FIG. 1) receives that the driver US has operated the switching instruction input unit KN to issue the switching instruction KS of the irradiation lamp ST at time t1, and advances the process to step ST13.

Here, since there is a predetermined action in step ST17 and then there is the switching operation KS in step ST12, it is estimated that the action detected in the previous step ST17 is the switching intention KI.

Step ST13: the irradiation lamp control unit SS (FIG. 1) switches the irradiation lamp ST from the lighting with the low beam (LOW) to the lighting with the high beam (HIGH) in response to the switching operation KS at time t1 in FIG. 6.

Step ST14: the learning unit GS (FIG. 1) trains the illumination switching control model of the illuminating body ST by using the environment information EJ stored in step ST19, that is, the environment information EJ at time t2 at which it is estimated that the driver US has a switching intention KI for the irradiation lamp ST, and updates the illumination switching control model stored in the irradiation lamp control unit SS.

Note that time t1 corresponds to a "first time point", and time t2 corresponds to a "second time point".

The learning unit GS learns the environment information EJ at time t1 described above, that is, illuminance E1 as teacher data, and updates the illumination switching control model. The learning by the learning unit GS is performed using, for example, an adaptive filter, a convolutional neural network (CNN), fuzzy control, adjustment of a threshold, or the like.

The illumination switching control model updated by learning is reflected in the switching condition KJ in the following step ST20.

After step ST14, the process goes through step ST22, and returns to step ST12 to continue the process in a similar manner.

<Supplementary Description of Learning>

The simplest learning is to directly replace the value of the latest environment information EJ stored in step ST19 with the switching condition KJ. In this case, the operation is "when the illuminance is lowered to the illuminance E2 at time t2 at which the driver US is estimated to have indicated the switching intention KI, the irradiation lamp ST is switched from the lighting with the low beam (LOW) to the lighting with the high beam (HIGH)".

As a slightly complicated method, it is possible to employ a method of learning using statistical processing of E2($n$) performed several times in the past, for example, an average value. In this case, the irradiation lamp ST is not necessarily switched by the latest stored environment information EJ.

In addition, also in the case of the illumination switching control model by fuzzy or CNN, the irradiation lamp ST is not necessarily switched by the most recently stored environment information EJ. Therefore, it is an operation that "when the illuminance decreases to a value at which the illuminance is closer to E2 than the illuminance E1 learned using the illuminance E2 at time t2 when the driver US is estimated to have indicated the switching intention KI, the irradiation lamp ST is switched from the lighting with the low beam (LOW) to the lighting with the high beam (HIGH)".

As an example, when a method of learning using a plurality of values is employed in step ST14, it means that learning is performed using a plurality of values stored in past step ST19.

Effects of First Embodiment

As described above, in the light distribution control device HSD of the first embodiment, when the driver US drives the host vehicle JS with the irradiation lamp ST turned on with the low beam (LOW), and the illuminance, which is the environment in which the host vehicle JS is placed, gradually decreases, the irradiation lamp control unit SS switches the irradiation lamp ST from turning on with the low beam (LOW) to turning on with the high beam (HIGH) when the illuminance, which is the environment in which the host vehicle JS is placed, decreases to the illuminance E2 at time t2 at which the driver US is estimated to have indicated the switching intention KI, which is larger than the illuminance E1 at time t1 at which the driver US has performed the switching operation KS. Thus, it is possible to avoid a situation in which the driver US continues to drive the host vehicle JS in a situation where the field of view is not appropriate for the driver US.

<Modification 1>

"Illuminance per unit time including time t" and "change amount of illuminance" may be used instead of "illuminance at time t" that is the environment indicated by the environment information EJ in the first embodiment.

<Modification 2>

Instead of the "illuminance at time t2" that is the environment indicated by the environment information EJ in the first embodiment, an "image in front of the host vehicle JS captured at time t2" may be used. The image may be used as it is, one obtained by performing some image processing (for example, image filtering processing and averaging processing) on the image may be used, the captured image may be divided into a plurality of image regions, for example, 100*100 and 10,000 parameters obtained by performing the image filtering processing on each of the divided image regions may be used for training data, a combination of the illuminance described above and the image may be used, or other information (for example, the position of the host vehicle JS, the type of the road on which the host vehicle JS travels, and the speed at which the host vehicle JS travels) related to traveling of the host vehicle JS may be used in combination.

That is, the illumination switching control model is not limited to learning some threshold (for example, illuminance) obtained at the time when it is estimated that the switching intention KI is indicated, and may learn a driving scene obtained at the time when it is estimated that the switching intention KI is indicated, that is, a front image as teacher data. In addition, as described above, instead of the "driving scene at time t2", a "driving scene in a unit time including time t2" and a "change amount of the driving scene" may be used. That is, the illuminance, the type of the driving scene, and the like exemplified as the teacher data, the timing and period of acquiring the teacher data, the method of processing the teacher data, and the like can be read and changed in the present specification. In order to avoid complexity, in the present specification, the description will proceed on the same assumption below.

<Modification 3>

In addition to (A1) to (A3) described above, the intention estimating unit IS may perform the estimation of whether or not the driver US is looking at a far side using the following.

(A4) Whether or not the driver US frowns (A5) Whether or not the driver US is fixating his/her eyes (A6) Whether or not the driver US leans forward For estimating whether or not the driver US is looking at a far side, for example, it is possible to supplementarily use the exchange "Is it dark?", "Yes/No", or the like with the driver US by voice or the like. By making such an inquiry when the estimation is uncertain, the estimation accuracy can be ensured.

<Modification 4>

The intention estimating unit IS may perform the estimation of whether or not the driver US is looking at a glaring object using the following in addition to (B1) to (B3).

(B4) Whether or not the driver US covers the face with the hand (B5) Whether or not the diameter of the pupil of the driver US is small For estimating whether or not the driver US is looking at a glaring object, for example, it is possible to supplementarily use the exchange "Is it bright?" and "Yes/No", or the like with the driver US by voice or the like.

<Modification 5>

FIG. 8 is a time chart illustrating operation of a light distribution control device HSD of Modification 5 of the first embodiment (part 1).

FIG. 9 is a time chart illustrating the operation of the light distribution control device HSD of Modification 5 of the first embodiment (part 2).

As illustrated in FIGS. 8 and 9, for example, "illuminance at time t5 that is an intermediate point between time t2 and time t1" may be used instead of the "illuminance E2 at time t2" in the first embodiment. In order to further improve the followability to the driver US indicating the switching intention KI, it is desirable to employ a time closer to time t2.

Time t5 corresponds to a "third time point".

<Modification 6>

As illustrated in FIGS. 8 and 9, for example, "illuminance at time t6 that is an intermediate point between time t2 and time t0" may be used instead of the "illuminance E2 at time t2" in the first embodiment. In order to further improve the followability to the driver US indicating the switching intention KI, it is desirable to employ illuminance closer to the illuminance at time t2. Here, time to is a time point at which the illuminance starts to become dark (in the case of FIG. 8) and a time point at which the illuminance starts to become bright (in the case of FIG. 9).

Time t6 corresponds to the "third time point".

<Modification 7>

In addition to the illuminance at only one time t2 in the first embodiment, illuminances at t5 and t6 (for example, it is illustrated in FIG. 8) may be used in combination. Even when the illuminance that is largely different from the illuminance at a normal time is accidentally generated, it is possible to suppress the occurrence of a situation in which the operation of estimating the switching intention KI by the intention estimating unit IS becomes unstable.

Time t5 and time t6 correspond to the "third time point".

<Modification 8>

Figure 10:
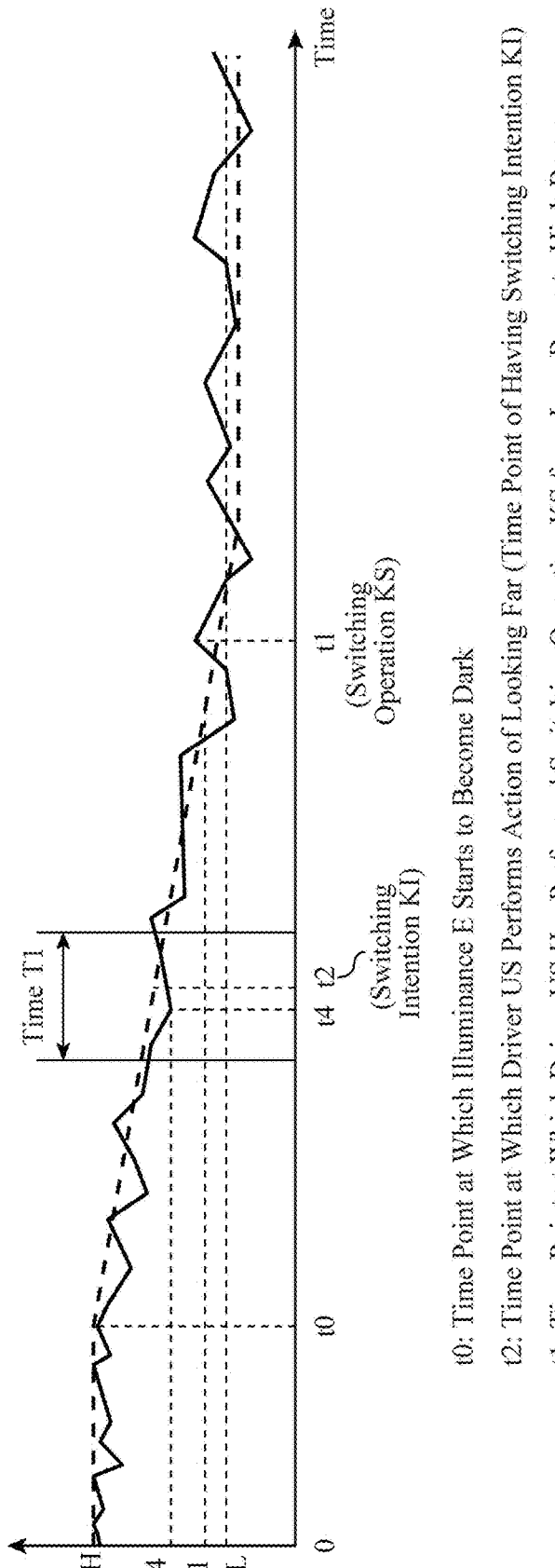
FIG. 10 is a time chart illustrating operation of a light distribution control device HSD of Modification 8 of the first embodiment.

FIG. 10 is a time chart illustrating operation of the light distribution control device HSD of Modification 8 of the first embodiment.

The illuminance, which is the environment in which the host vehicle JS is placed, generally changes while moving up and down, and decreases while moving up and down, for example, as illustrated in FIG. 10. Therefore, it is desirable to use the minimum illuminance, the average illuminance, and a plurality of illuminances within a predetermined time T1 (for example, 1 second) including time t2. Thus, effects similar to those of Modification 7 can be obtained.

A time within time T1, for example, time t4 is a time point at which the illuminance becomes a minimum value, and corresponds to the "third time point".

<Modification 9>

Figure 11:
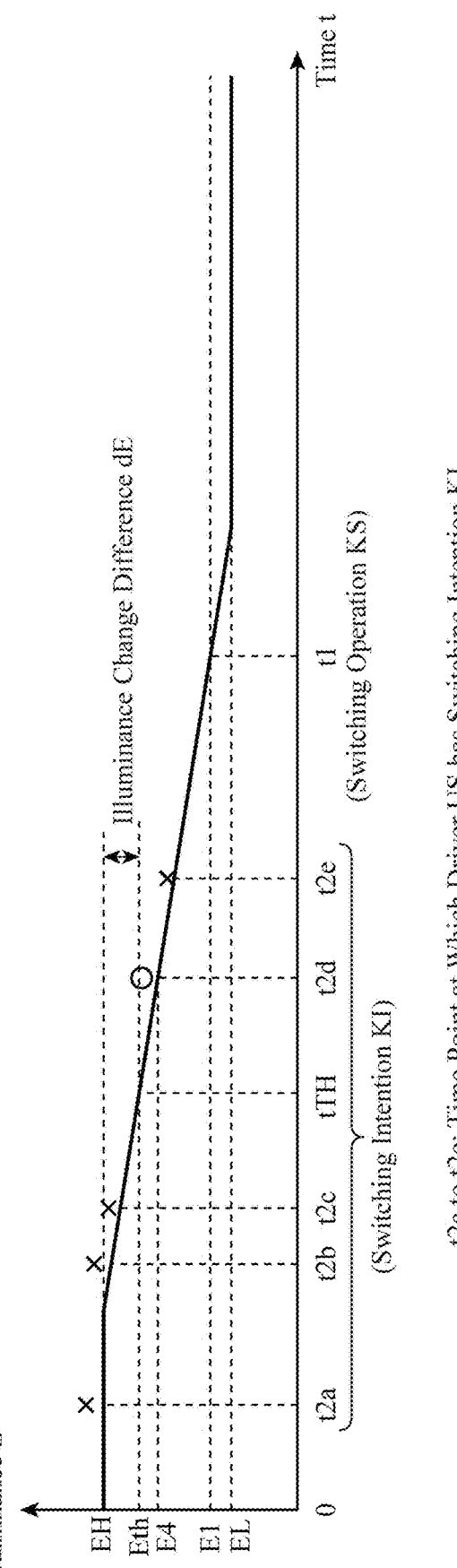
FIG. 11 is a time chart illustrating operation of a light distribution control device HSD of Modification 9 of the first embodiment.

FIG. 11 is a time chart illustrating operation of the light distribution control device HSD of Modification 9 of the first embodiment.

As illustrated in FIG. 11, it is assumed that times t2a, t2b, t2c, t2d, and t2e at which the driver US would have the switching intention KI are present before time t1 at which the driver US gives the switching instruction KS.

In FIG. 11, time tTH is a time point when the illuminance at the position where host vehicle JS is placed reaches illuminance Eth in which the illuminance has decreased by a predetermined illuminance change difference dE from the maximum illuminance EH.

The illuminance change difference dE may be, for example, 10% (EH*0.1) of the maximum illuminance EH, or may be 10% ((EH−E1)*0.1) of the difference between the maximum illuminance EH and the illuminance E1 at time t1.

The intention estimating unit IS estimates that the driver US has a switching intention KI when the illuminance at which the host vehicle JS is placed reaches the illuminance after time tTH which is the illuminance Eth decreased by the illuminance change difference dE from the maximum illuminance EH which is the current illuminance before time t1 at which the driver US gives the switching instruction KS among times t2a to t2e described above, that is, illuminance at time t2d or illuminance at time t2e.

It is desirable that the intention estimating unit IS performs the estimation on the basis of the illuminance at a time point farther from time t1 among times t2d and t2e, in other words, time t2d at which the driver US has the switching intention KI earlier.

If there is no time point at which the driver US would have the switching intention KI after time tTH, any illuminance within a range from the illuminance Eth at time tTH to the illuminance E1 at time t1 may be employed.

The time after time tTH corresponds to the "third time point"

<Modification 10>

Figure 12:
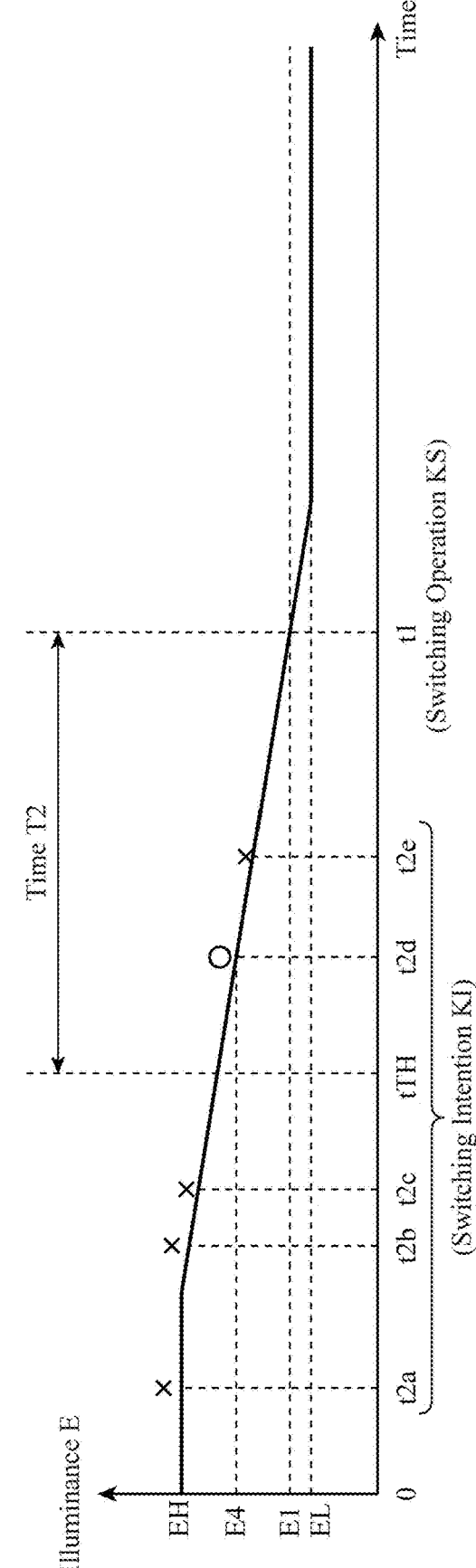
FIG. 12 is a time chart illustrating operation of a light distribution control device HSD of Modification 10 of the first embodiment.

FIG. 12 is a time chart illustrating operation of the light distribution control device HSD of Modification 10 of the first embodiment.

Figure 13:
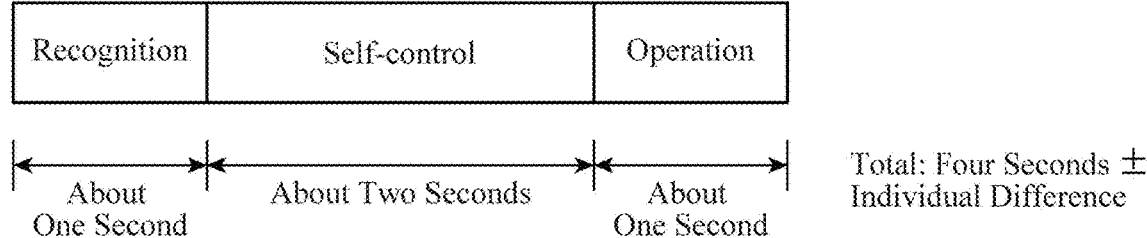
FIG. 13 illustrates time for recognition, self-control, and operation of a driver US of Modification 10 of the first embodiment.

FIG. 13 illustrates recognition, self-control, and operation time of the driver US of Modification 10 of the first embodiment.

As illustrated in FIG. 12, similarly to Modification 9, it is assumed that times t2a, t2b, t2c, t2d, and t2e at which the driver US would have the switching intention KI are present before time t1 at which the driver US gives the switching instruction KS.

In FIG. 12, time tTH is a time point going back from time t1 by a predetermined time T2.

Time T2 is, for example, a time from the time when the driver US feels uncomfortable about the illuminance that is the environment of the host vehicle JS (in other words, at the time point when the user has the switching intention KI) to the time when the switching operation KS is actually performed. As illustrated in FIG. 13, time T2 is a time obtained by adding a time of recognition (driver US feels dark), a time of self-control (driver US squints his/her eyes), and a time of operation (the driver US releases his/her hand from the steering wheel and operates the lever of the irradiation lamp ST), and is, for example, fixedly about 4 seconds.

It is desirable that the above summed time takes into consideration personal characteristics of the driver US, for example, the personality and age of the driver US, and the tension level and the wakefulness level when the driver US is driving. The above summed time becomes shorter as the tension and wakefulness are higher.

The intention estimating unit IS estimates that the driver US has the switching intention KI when the illuminance, which is the environment in which the host vehicle JS is placed, reaches the illuminance at time t2d or the illuminance at time t2e which is before time t1 at which the driver US gives the switching instruction KS and after time tTH which is a time backward from time t1 by time T2 among times t2a to t2e.

It is desirable that the intention estimating unit IS performs the estimation on the basis of the illuminance at time t2e out of the illuminance at time t2d and the illuminance at time t2e, similarly to Modification 9.

The time after time tTH corresponds to the "third time point".

Time T2 may be variable, as opposed to what is described above, and may be changed, for example, depending on the speed of travel of the host vehicle JS.

Time T2 may be determined by using, for example, the irradiatable range (for example, 40 m) of the low beam of the irradiation lamp ST, the traveling speed (for example, 60 km/hour) of the host vehicle JS, and some coefficient.

As time T2, for example, a value obtained by multiplying the required time Tv for the host vehicle JS to travel in the irradiatable range of the irradiation lamp ST by an appropriate coefficient $\alpha$ may be employed. Tv=2.4 seconds (=40 m/(60 km*1000/60/60)), and thus, using $\alpha$=2 for example, T2=4.8 seconds (=$\alpha$*Tv) may be satisfied.

For example, time T2 may be 6.4 seconds (=40 m/(60 km*1000/60/60)+4 seconds) on the basis of the time required for the host vehicle JS to travel in the irradiatable range of the irradiation lamp ST and the total time of about 4 seconds (=time of recognition+time of self-control+time of operation) described above.

Time T2 is different from the above, and when the irradiation lamp ST emits the high beam (whose irradiatable range is, for example, 100 m), Tv=6 seconds (=100 m/(60 km*1000/60/60)), and thus T2=2*6=12 seconds may be used instead of the former time of 4.8 seconds, or 10 seconds may be used instead of the latter time of 6.4 seconds.

Time t5, time 6, and the like in Modifications 5 to 10 corresponding to the "third time point" are time points before time t1 (time point of the switching instruction KS), and can be positioned to be equivalent to the above-described time t2 (time point of the switching intention KI) in that there is room to be a basis for estimating whether or not the driver US has the switching intention KI.

<Modification 11>

Instead of switching between the lighting with the low beam (LOW) and the lighting with the high beam (HIGH) in the first embodiment, switching between the lighting with the low beam (LOW) and turning off and switching between the lighting with the high beam (HIGH) and turning off can also be performed.

<Modification 12>

The switching instruction input unit KN of the first embodiment may use, for example, an operation by a gesture and an input of a command by voice instead of the operation by the lever switch described above.

<Modification 13>

Instead of the first embodiment in which it is estimated that the time point at which the driver US has the switching intention KI is the time point at which the driver US has performed an action of looking far or an action of looking at a glaring object, for example, it may be estimated that the time point at which the driver US has the switching intention KI is the time point at which the driver US has performed an action before performing the action (hereinafter, it is referred to as "predictive action").

The time point of the predictive action described above may be, for example, the time point (2) or the time point (3) in the flow of (1) the driver US is gripping the steering wheel with both hands→(2) the driver US releases one hand from the steering wheel→(3) one hand away from the steering wheel gradually approaches the switching instruction input unit KN (lever switch or the like)→(4) the driver US performs the switching operation KS by the switching instruction input unit KN (lever switch or the like).

<Modification 14>

Unlike the first embodiment in which the light distribution control device HSD and the irradiation lamp ST are separated (FIG. 1), the irradiation lamp ST and the light distribution control device HSD may be integrated, or for example, the irradiation lamp ST may include the light distribution control device HSD.

Unlike the first embodiment in which the light distribution control device HSD does not include the switching instruction input unit KN, the driver state detecting unit UK, and the environment detecting unit EK, the light distribution control device HSD may include at least one of the switching instruction input unit KN, the driver state detecting unit UK, or the environment detecting unit EK.

<Modification 15>

Unlike the first embodiment in which the switching instruction receiving unit KU receives the switching instruction KS from the switching instruction input unit KN, for example, the irradiation lamp control unit SS or the irradiation lamp ST may directly receive the switching instruction KS from the switching instruction input unit KN, and the irradiation lamp ST may be switched without referring to learning by the learning unit GS and according to the switching instruction KS.

<Modification 16>

It is desirable that the learning unit GS learns the illuminance, which is the environment at time t2 (for example, it is illustrated in FIG. 6) estimated for each driver of the plurality of drivers (for example, a family member of the driver US) including the driver US.

SECOND EMBODIMENT

Second Embodiment

A light distribution control device of a second embodiment will be described.

A light distribution control device HSD of the second embodiment is different from the light distribution control device HSD of the first embodiment using "illuminance" as the environment information EJ, and uses an "image" captured in front of the host vehicle JS as the environment information EJ as teacher data. As an example of processing into teacher data, in the second embodiment, "brightness" of each of a plurality of areas divided from the image is used.

Function of Second Embodiment

Figure 14:
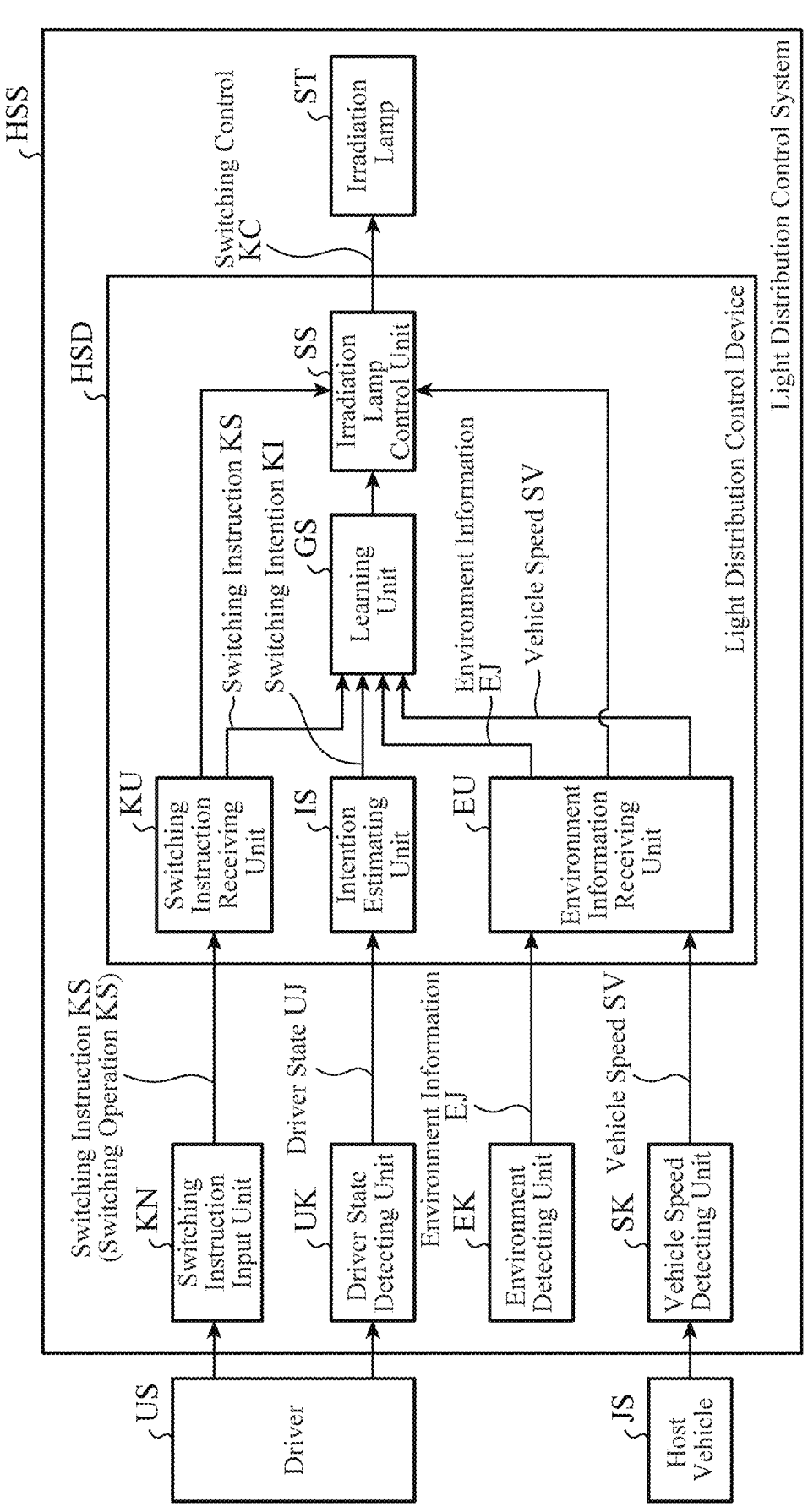
FIG. 14 is a functional block diagram of a light distribution control system HSS of a second embodiment.

FIG. 14 is a functional block diagram of the light distribution control system HSS of the second embodiment.

As is clear from the comparison between FIG. 14 and FIG. 1 (the functional block diagram of the first embodiment), the light distribution control system of the second embodiment basically has a function similar to that of the light distribution control system HSS of the first embodiment.

On the other hand, the light distribution control system HSS of the second embodiment is different from the light distribution control system HSS of the first embodiment, and the environment detecting unit EK of the second embodiment includes a function different from that of the environment detecting unit EK of the first embodiment, and further includes a vehicle speed detecting unit SK.

The environment detecting unit EK captures an image in front of the host vehicle JS as the environment information EJ.

The vehicle speed detecting unit SK detects the vehicle speed of the host vehicle JS.

The environment information receiving unit EU receives the image from the environment detecting unit EK and receives the vehicle speed SV from the driver state detecting unit UK.

Hardware Configuration of Second Embodiment

The configuration of the light distribution control device HSD of the second embodiment is similar to the hardware configuration (FIG. 4) of the light distribution control device HSD of the first embodiment.

Operation of Second Embodiment

Figure 15:
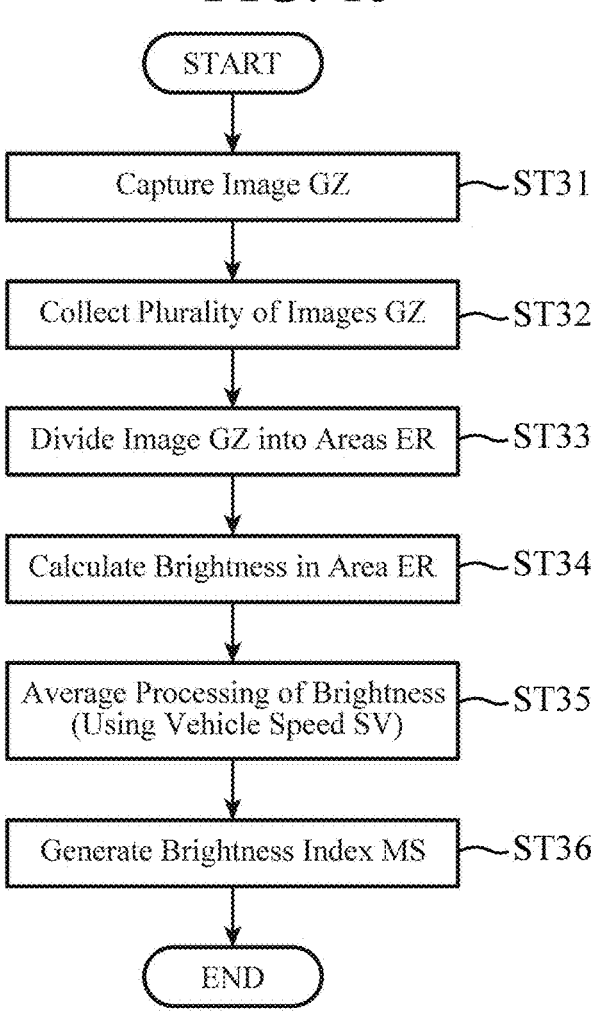
FIG. 15 is a flowchart illustrating operation of a light distribution control device HSD of the second embodiment.

FIG. 15 is a flowchart illustrating operation of the light distribution control device HSD of the second embodiment.

Figure 16:
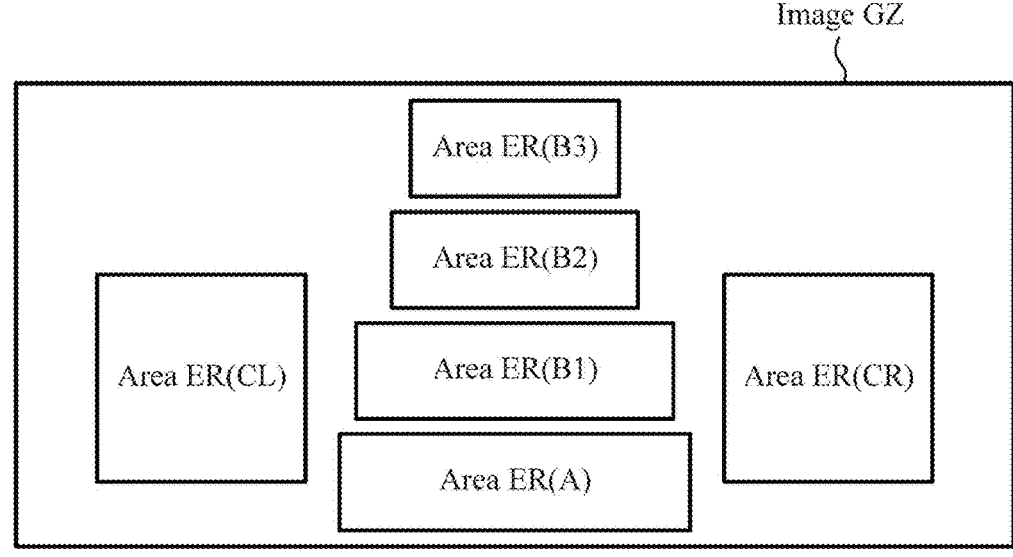
FIG. 16 illustrates an image GZ of the light distribution control device HSD of the second embodiment.

FIG. 16 illustrates an image GZ of the light distribution control device HSD of the second embodiment.

Figure 17:
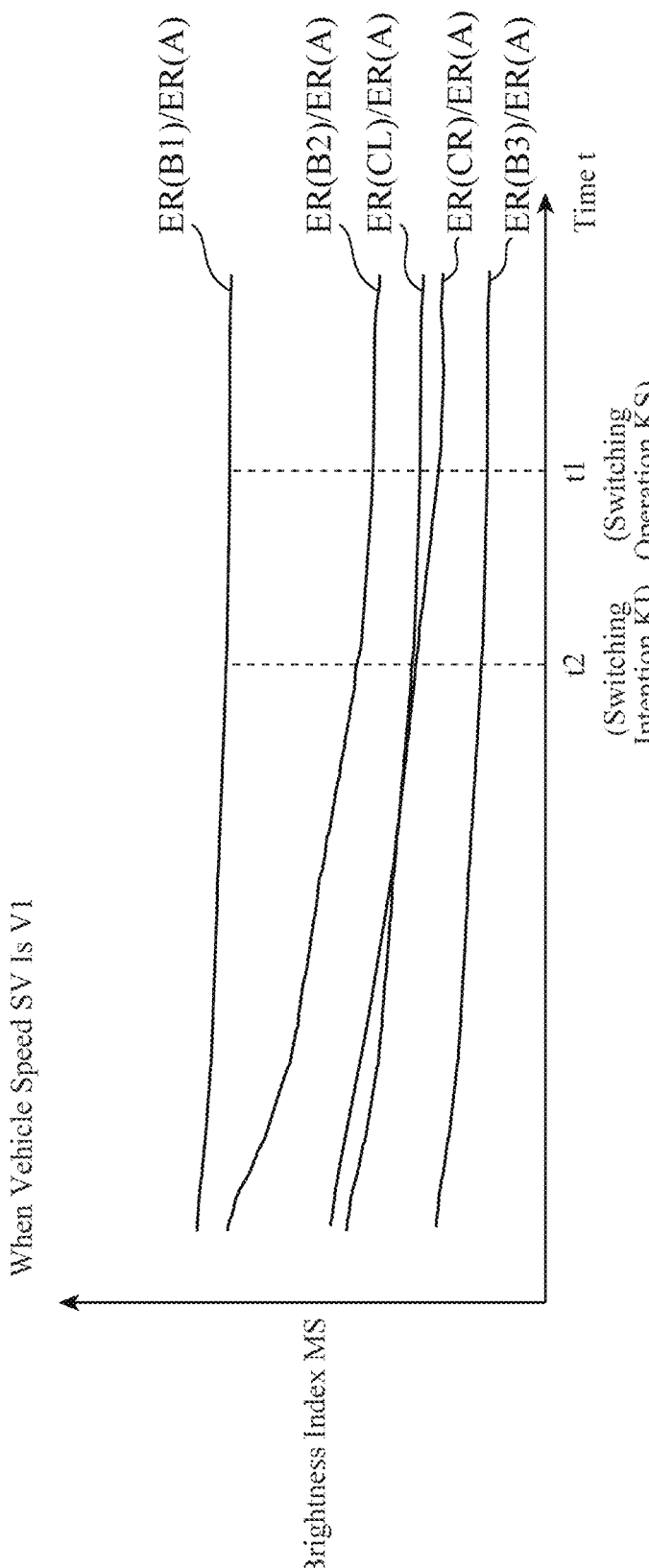
FIG. 17 is a time chart illustrating operation of the light distribution control device HSD of the second embodiment.

FIG. 17 is a time chart illustrating operation of the light distribution control device HSD of the second embodiment.

Step ST31: the environment detecting unit EK captures an image GZ (illustrated in FIG. 16) in front of the host vehicle JS.

Step ST32: the environment information receiving unit EU receives the image GZ captured by the environment detecting unit EK, more precisely, a plurality of images GZ, that is, collects the plurality of images GZ.

Step ST33: the learning unit GS divides each of the plurality of images GZ into a plurality of areas ER(A) to ER(CR) as illustrated in FIG. 16.

The area ER(A) is, for example, an image of a location on the front side in front of the host vehicle JS.

The area ER(B1) is, for example, an image of a location near the host vehicle JS. The area ER(B3) is, for example, an image of a place far from the host vehicle JS. The area ER(B2) is an image of a place between the area ER(B1) and the area ER(B3).

The area ER(CL) is an image of a location (for example, a road shoulder) on the left side of the host vehicle JS. The area ER(CR) is an image of a location (the same as the left) on the right side of the host vehicle JS.

Step ST34: the learning unit GS calculates brightness, that is, brightness for each area of the areas ER(A) to ER(CR) for each image of the plurality of images GZ.

Step ST35: the learning unit GS performs averaging processing on the calculated brightness for each area ER. For example, the learning unit GS calculates an arithmetic average on the basis of luminance of pixels (not illustrated) included in each area ER. The learning unit GS may adjust, for example, the quantity of the plurality of images GZ to be processed, in other words, the number of the images GZ to be processed by considering the vehicle speed SV of the host vehicle JS when performing the averaging processing.

Step ST36: the learning unit GS generates a brightness index MS.

The brightness index MS is, for example, a ratio of the brightness of the other areas ER(B1) to ER(CR) to the brightness of the area ER(A) in which the temporal change of the brightness is small (for example, brightness of ER(B2)/brightness of ER(A). Hereinafter, ER(B2)/ER(A) may be abbreviated or illustrated).

As illustrated in FIG. 17, when the vehicle speed SV is constant at V1, by using the relationship between time t and the "ratio of brightness", that is, a curve (for example, the curve of ER(B2)/ER(A)) of the brightness index MS, it is possible to switch from the lighting with the low beam (LOW) to the lighting with the high beam (HIGH) at time t2, similarly to the first embodiment (FIG. 6) using the relationship between time and "illuminance E", that is, a curve of the "illuminance E".

Here, all of ER(B1)/ER(A), ER(B2)/ER(A), and ER(B3)/ER(A) may be used with the same weight, but the weight may be changed using the fact that the distance gazed by the driver US when the vehicle speed becomes faster changes, for example, in vehicle speed×3 seconds, or any one may be selected and used as the teacher data. The relationship between the speed and the gaze distance is used for weighting and selection.

For example, ER(B3) is divided in such a manner as to be a front road image having a gaze distance corresponding to 60 km/h, ER(B2) is divided in such a manner as to be a front road image of 40 km/h or more and less than 60 km/h, ER(B1) is divided in such a manner as to be a front road image of 20 km/h or more and less than 40 km/h, and ER(A) is divided in such a manner as to be a road image before ER(B1).

ER(B3) is divided in such a manner as to be a road image ahead of 50 m (=3 seconds*60 Km*1000/(60*60)) or more, ER(B2) is divided in such a manner as to be a road image ahead of 33 m or more and less than 50 m, ER(B1) is divided in such a manner as to be a road image ahead of 16.5 m or more and less than 33 m, and ER(A) is divided in such a manner as to be a road image ahead of less than 16.5 m.

In a case where the speed is equal to or more than 60 km/h, learning may be performed with the weight of ER(B3)/ER(A) being the largest, or the weight other than ER(B3)/ER(A) may be set to 0. In a case where the speed is equal to or more than 40 km/h and less than 60 km/h, it is sufficient if the weight of ER(B2)/ER(A) is set to be the largest for learning. By changing the weight according to the vehicle speed in this manner, the illumination switching control model is obtained in which the parameter corresponding to the gaze distance is regarded as important.

Effects of Second Embodiment

As described above, in the light distribution control device HSD of the second embodiment, effects similar to those of the first embodiment can be obtained by using the brightness index MS instead of the illuminance E in the first embodiment. Further, by using the brightness index MS, it is possible to cope with various driving scenes.

<Modification 1>

Figure 18:
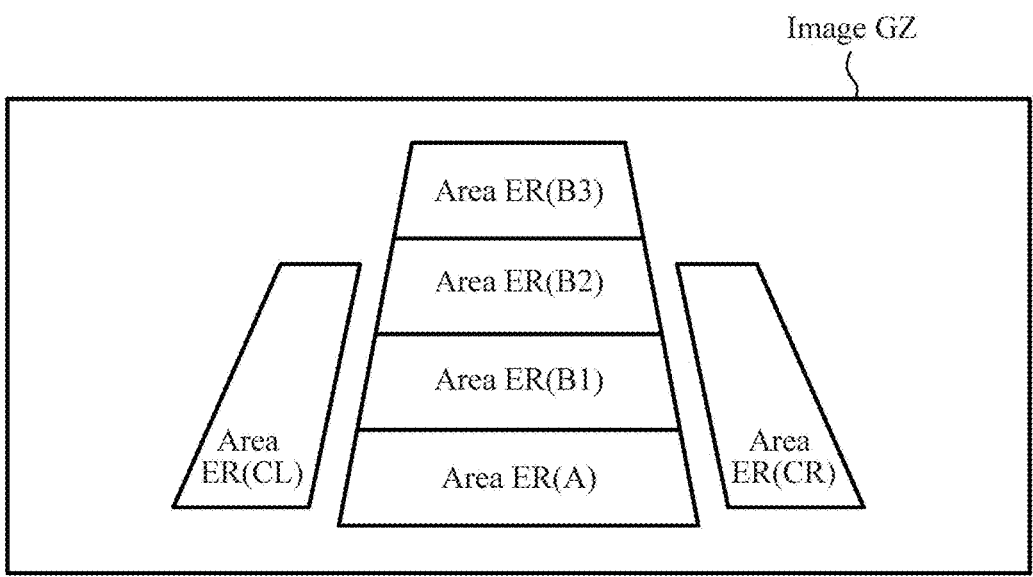
FIG. 18 illustrates an area ER of Modification 1 of the second embodiment.

FIG. 18 illustrates an area ER of Modification 1 of the second embodiment.

Unlike the second embodiment in which the areas ER(A) to ER(CR) are rectangular, in Modification 1, the areas ER(A) to ER(CR) have shapes matching the shape of the road on which the host vehicle JS travels, as illustrated in FIG. 18. In Modification 1, the image GZ is divided into the areas ER(A) to ER(CR) having shapes matching the shape of the road on which the host vehicle JS travels. For example, it is sufficient if the area division is performed by performing image recognition processing on the front captured image and extracting a portion of the front road.

Compared with the second embodiment in which the image GZ is divided using ER(A) to ER(CR) having rectangles, for example, the boundary between the road shoulder and the road surface can be made clearer. Thus, the brightness calculated for each area ER, more accurately, the ratio of the brightness (for example, ER(B2)/ER(A)) becomes more accurate. Thus, the value of the brightness index MS at time t2 on each curve of the graph of FIG. 17, for example, ER(B2)/ER(A) becomes more accurate.

<Modification 2>

Figure 19:
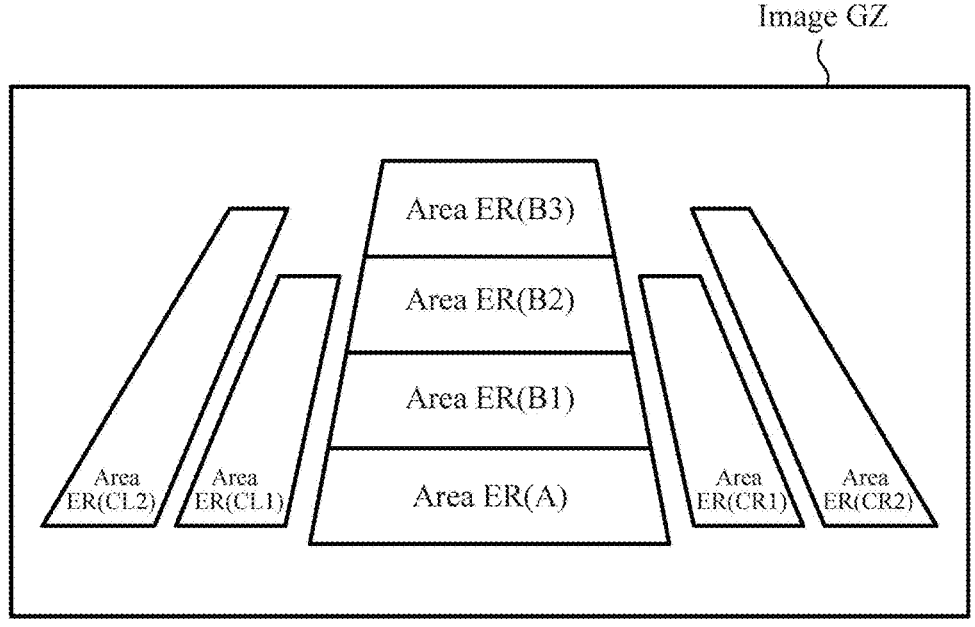
FIG. 19 illustrates an area ER of Modification 2 of the second embodiment.

FIG. 19 illustrates an area ER of Modification 2 of the second embodiment.

Unlike Modification 1 in which the image GZ is divided using two areas ER(CL) and ER(CR) that are sides of the host vehicle JS, in Modification 2, the image GZ is divided using four areas ER(CL1), ER(CL2), ER(CR1), and ER(CR2) that are sides of the host vehicle JS.

For example, brightness in a roadside zone of the road on which the host vehicle JS travels is calculated by the areas ER(CL1) and ER(CR1) that are relatively close to the host vehicle JS, that is, near the host vehicle JS, and on the other hand, brightness affected by a street light installed along the road on which the host vehicle JS travels is calculated by the areas ER(CL2) and ER(CR2) that are relatively far from the host vehicle JS, that is, far from the host vehicle JS. The areas ER(CL2) and ER(CR2) are set as areas in which streetlights or the like are reflected in the image GZ.

It is also possible to exclude the influence of the street lamp by considering brightness in the areas ER(CL1), ER(CL2), ER(CR1), and ER(CR2), and it is possible to calculate the brightness index MS with higher accuracy.

<Modification 3>

Figure 20:
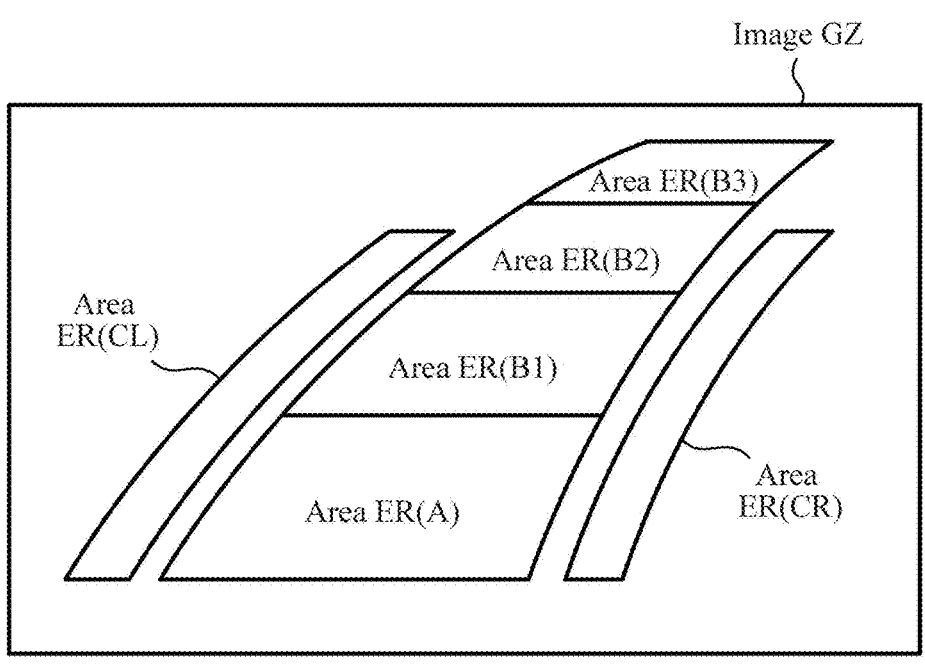
FIG. 20 illustrates an area ER of Modification 3 of the second embodiment.

FIG. 20 illustrates an area ER of Modification 3 of the second embodiment.

In Modification 3, similarly to Modification 1, ER(A) to ER(CR) having shapes of curves corresponding to a shape of the road on which JS travels, in particular, a shape of a curve of the road are used. Thus, brightness calculated for each area of the areas ER(A) to ER(CR) can be made higher in accuracy, and thus, the accuracy of the value of the brightness index MS can be made higher.

The shape of the road on which the host vehicle JS travels can be obtained, for example, by using a map database and a positioning device (for example, a global positioning system (GPS) or a high definition locator (HDL) may be used), by using a car navigation device, or by specifying the shape of a white line or the like from a video captured in front of the host vehicle JS.

<Modification 4>

Unlike the second embodiment using both the image GZ and the vehicle speed SV, only the image GZ may be used.

Unlike the second embodiment in which three areas ER(B1), ER(B2), and ER(B3) are used, for example, only one area ER(B1) may be used, two areas ER(B1) and ER(B2) may be used, or four areas ER(B1), ER(B2), ER(B3), and ER(B4) (not illustrated) may be used, and in summary, the number of areas to be used is not limited at all.

Unlike the second embodiment in which all the areas ER(A) to ER(CR) are used, for example, only the areas ER(A) and ER(B1) to ER(B3) may be used, or only the areas ER(A), ER(CL), and ER(CR) may be used.

<Modification 5>

In addition to the image GZ used in the second embodiment, for example, illuminance (this will be described in the first embodiment) may be used, and further, map information may be used.

THIRD EMBODIMENT

Third Embodiment

A light distribution control system HSS and a light distribution control device HSD of a third embodiment are different from the light distribution control system HSS and the light distribution control device HSD of the first embodiment using "illuminance" as the environment information EJ, and use "urban area degree" as the environment information EJ.

Figure 21:
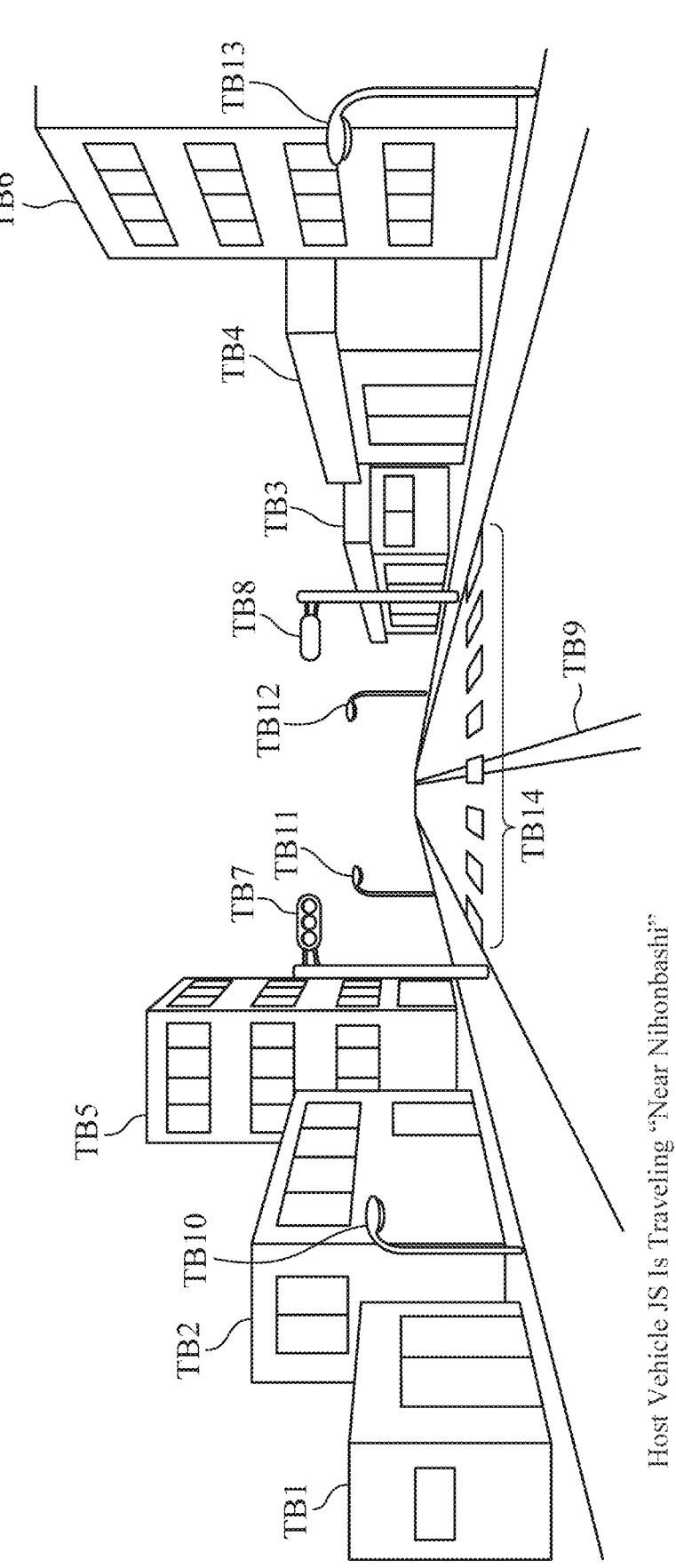
FIG. 21 illustrates an example of an urban area.

FIG. 21 illustrates an example of an urban area.

As illustrated in FIG. 21, the "urban area degree" refers to, for example, a degree to which buildings (for example, a general residence, a commercial store, or a building) TB1 to TB6 and public facilities (for example, a pedestrian crossing, a traffic light, a street light, or a lane) TB7 to TB13 for transportation are densely arranged. Hereinafter, a "construction, public facility for transportation, or the like" is referred to as an "object".

For example, as illustrated in FIG. 21, the driver US has an intention to switch between the low beam and the high beam depending on the brightness in the vicinity of the host vehicle JS when the host vehicle is traveling near Nihonbashi, which is an urban area. In contrast to the above, for example, when the driver US is traveling in a suburb away from the urban area, the driver US has an intention to switch between the low beam and the high beam in consideration of how the brightness of the far side of the host vehicle JS is in addition to how the brightness of a near side of the host vehicle JS described above is. Here, the urban area degree is, for example, an index indicated by the density of a building having a lighting facility (hereinafter also referred to as an object) within a predetermined range ahead.

Configuration and Hardware Configuration of Third Embodiment

Figure 22:
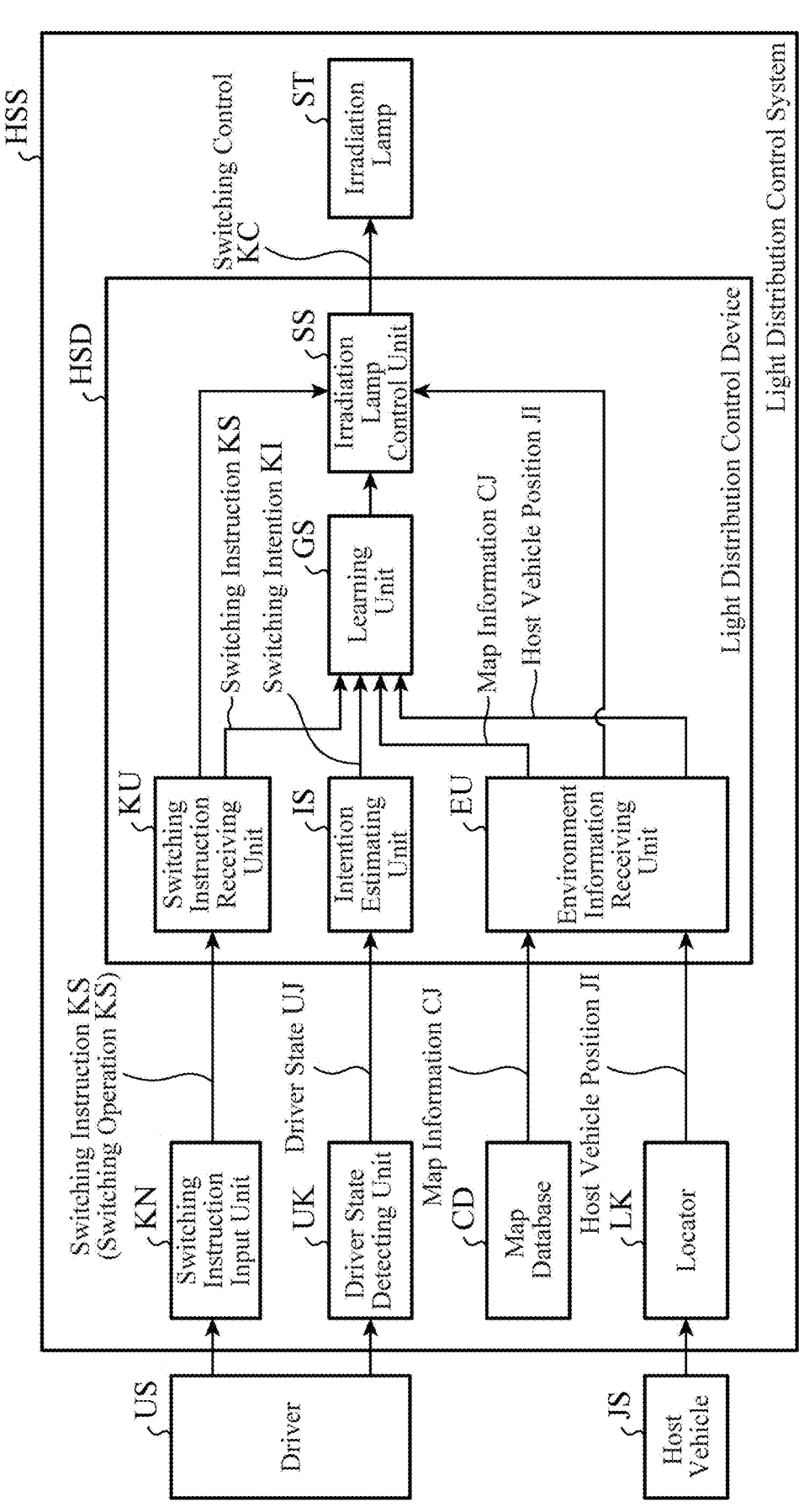
FIG. 22 is a functional block diagram of a light distribution control system HSS of a third embodiment.

FIG. 22 is a functional block diagram of a light distribution control system HSS of the third embodiment.

As is clear from the comparison between FIG. 22 and FIG. 1 (the functional block diagram of the first embodiment), the function of the light distribution control system HSS of the third embodiment is basically similar to the functions of the light distribution control system HSS and the light distribution control device HSD of the first embodiment.

The light distribution control system HSS of the third embodiment is different from the light distribution control system HSS of the first embodiment on the other hand, and further includes a map database CD and a locator LK.

The map database CD stores the attribute of the object TB and the position where the object is located. When the position information is designated, the map database CD outputs information on an object in a predetermined range. For example, FIG. 21 illustrates the presence of the objects TB1 to TB13 in a predetermined range when the vehicle is traveling at a specific position "near Nihonbashi".

The locator LK measures the position of the host vehicle JS.

Hardware Configuration of Third Embodiment

The hardware configuration of the light distribution control device HSD of the third embodiment is similar to the hardware configuration (FIG. 4) of the light distribution control device HSD of the first embodiment.

Operation of Third Embodiment

Operation of the light distribution control device HSD of the third embodiment is basically similar to the operation of the light distribution control device HSD of the first embodiment (FIG. 5).

On the other hand, the operation of the light distribution control device HSD of the third embodiment is different from that of the light distribution control device HSD of the first embodiment in the acquisition of the environment information EJ in steps ST14 and ST18 (FIG. 5), that is, the acquisition of the urban area degree.

Figure 23:
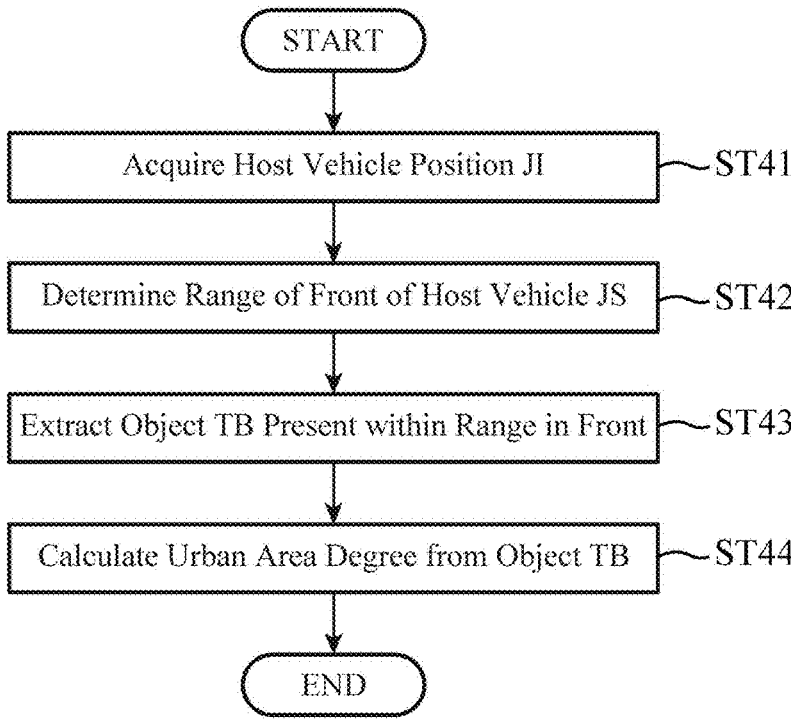
FIG. 23 is a flowchart illustrating operation of acquiring environment information EJ of the light distribution control system HSS of the third embodiment.

FIG. 23 is a flowchart illustrating operation of acquiring the environment information EJ of the light distribution control system HSS of the third embodiment.

As described above, the acquisition of the urban area degree, which is the acquisition of the environment information EJ, is performed in steps ST14 and ST18. Specifically, in steps ST14 and ST18, the following steps ST41 to ST44 are performed.

Step ST41: the locator LK measures the position of the host vehicle JS, that is, a host vehicle position JI.

Step ST42: the environment information receiving unit EU determines a range in front of the host vehicle JS. The environment information receiving unit EU determines the range in front of the host vehicle JS as, for example, a range of a circle having a radius of 100 m to 400 m. The length of the radius is calculated from, for example, a distance that the host vehicle JS moves at a speed when the host vehicle JS is traveling for several seconds to several 10 seconds. Here, it is assumed that the range in front of the host vehicle JS is determined to be a range of a circle having a radius of 100 m.

Step ST43: the environment information receiving unit EU acquires the presence of the objects TB1 to TB13 from the map database CD on the basis of the host vehicle position JI. The environment information receiving unit EU further extracts an object in a range in front of the host vehicle JS, that is, a range of a circle having a radius of 100 m, for example, TB1, TB2, TB9, TB10, TB7, TB13, and so on from among the acquired objects TB1 to TB13.

Step ST44: on the basis of the extracted objects TB1, TB2, TB9, TB10, TB7, TB14, . . . the learning unit GS calculates the urban area degree as the environment information EJ, that is, acquires the environment information EJ. For example, the learning unit GS calculates the urban area degree by calculating the number of objects TB present per unit area.

As illustrated in FIG. 21, there are many objects and the urban area degree is high in the vicinity of "Nihonbashi". In addition, in the suburb, there are few objects and the urban area degree is low.

Effects of Third Embodiment

As described above, in the light distribution control device HSD of the third embodiment, since the urban area degree is used as the environment information EJ, similarly to the first embodiment in which the illuminance is used as the environment information EJ and the second embodiment in which the image (more precisely, brightness) is used as the environment information EJ, the lighting with low beam (LOW) and the lighting with high beam (HIGH) can be switched.

<Modification 1>

The object TB may have a correlation with the environment of the urban area in addition to the building and the public facility for transportation described above. In addition, weighting depending on the type of the object (buildings, houses, road lights, traffic lights, and the like) may be assigned to calculate the urban area degree.

<Modification 2>

The front range may have another shape (for example, a square, a rectangle, or an ellipse) instead of the above-described circle.

<Modification 3>

The urban area degree may be calculated in advance and stored in the map database CD instead of being calculated by the learning unit GS.

<Modification 4>

Instead of calculating the urban area degree on the basis of the number of the objects TB stored in the map database CD or the like, the calculation may be performed on the basis of the object TB present in the captured image GZ (for example, it is illustrated in FIG. 16) as in the second embodiment.

<Modification 5>

As the environment information EJ, the illuminance of the first embodiment and the image of the second embodiment (more precisely, brightness) may be used in addition to the urban area degree of the third embodiment.

The above-described embodiments may be combined without departing from the gist of the present disclosure, and components in each embodiment may be appropriately deleted, changed, or other components may be added.

INDUSTRIAL APPLICABILITY

The light distribution control device according to the present disclosure can avoid a situation in which a driver travels in a situation where the field of view is not appropriate for the driver.

REFERENCE SIGNS LIST

CD: map database, dE: illuminance change difference, E: illuminance, EJ: environment information, EK: environment detecting unit, ER: area, EU: environment information receiving unit, GS: learning unit, GZ: image, HSD: light distribution control device, HSS: light distribution control system, IS: intention estimating unit, JI: host vehicle position, JS: host vehicle, KC: switching control, KI: switching intention, KB: storage medium, KJ: switching condition, KN: switching instruction input unit, KS: switching instruction, KS: switching operation, KU: switching instruction receiving unit, LK: locator, ME: memory, MS: brightness index, NY: input unit, PR: processor, PRG: program, SK: vehicle speed detecting unit, SS: irradiation lamp control unit, ST: irradiation lamp, SV: vehicle speed, SY: output unit, TB: object, UJ: driver state, UK: driver state detecting unit, US: driver

The invention claimed is:

1. A light distribution control device comprising:
processing circuitry configured to
receive environment information indicating an environment in which a host vehicle is placed;
receive an instruction from a driver of the host vehicle to switch an irradiation lamp of the host vehicle;
perform estimation of whether or not the driver has an intention to switch the irradiation lamp on a basis of an action of the driver;
switch the irradiation lamp of the host vehicle on a basis of the environment information; and
learn a driving scene in which the irradiation lamp of the host vehicle is to be switched by using the received environment information at a second time point at which the intention is estimated to be present, the second time point being prior to a first time point at which the instruction is received.

2. The light distribution control device according to claim 1, wherein
the processing circuitry performs the estimation on a basis of an action expressed by the driver when the driver feels uncomfortable about an irradiation state of the irradiation lamp.

3. The light distribution control device according to claim 2, wherein
when the driver performs an action to check a far side of the host vehicle, the processing circuitry estimates that the driver has an intention to irradiate the far side of the host vehicle rather than irradiating a near side of the host vehicle.

4. The light distribution control device according to claim 3, wherein
the processing circuitry estimates that the driver has performed the action to check the far side of the host vehicle when at least one of an action of changing a line-of-sight direction of the driver upward, an action of changing a face of the driver upward, or an action of opening eyelids of the driver is detected.

5. The light distribution control device according to claim 2, wherein
the processing circuitry estimates that the driver has an intention of irradiating the near side of the host vehicle rather than irradiating the far side of the host vehicle when the driver performs an action of feeling dazzled.

6. The light distribution control device according to claim 5, wherein
the processing circuitry estimates that the driver has performed an action of feeling dazzled when at least one of an action of squinting eyes of the driver or an action of covering a face of the driver with a hand of the driver is detected.

7. The light distribution control device according to claim 1, wherein the processing circuitry learns the environment information at least at one third time point that is a time point prior to the first time point and is recognized to be equivalent to the second time point with respect to an estimation of an intention of the driver.

8. The light distribution control device according to claim 1, wherein the environment information is based on brightness of each of a plurality of areas divided from an image obtained by imaging a front of the host vehicle.

9. The light distribution control device according to claim 8, wherein the processing circuitry learns, as the environment information, at least one of a first ratio that is a ratio of brightness at a far side of the host vehicle to brightness at a near side of the host vehicle or a second ratio that is a ratio of brightness at a side of the host vehicle to brightness at a near side of the host vehicle at the second time point, and the processing circuitry inputs the first ratio or the second ratio as the environment information and switches the irradiation lamp.

10. The light distribution control device according to claim 9, wherein the processing circuitry uses a side closer to the host vehicle and a further side of the side as sides of the host vehicle.

11. The light distribution control device according to claim 9, wherein the processing circuitry performs learning from the received image at the second time point on a basis of brightness of each of a plurality of areas divided along a shape of a road ahead of the host vehicle.

12. The light distribution control device according to claim 1, wherein the environment information is a degree of urbanization at a position where the host vehicle is placed.

13. The light distribution control device according to claim 1, wherein the processing circuitry performs the estimation on a basis of whether or not the driver has released one hand of the driver from positions of both hands of the driver when the driver drives the host vehicle to issue the instruction to switch the irradiation lamp of the host vehicle.

14. The light distribution control device according to claim 1, wherein the processing circuitry learns the environment information for each of a plurality of drivers including the driver.

15. The light distribution control device according to claim 7, wherein the processing circuitry learns an illumination switching control model using the environment information up to the third time point as teacher data.

16. The light distribution control device according to claim 1, wherein the processing circuitry learns an illumination switching control model by using, as teacher data, the environment information prior to the first time point and up to a time point going back from the first time point by a time different depending on a characteristic of the driver or a speed of the host vehicle.

17. The light distribution control device according to claim 1, wherein the processing circuitry selects the environment information at a plurality of specific time points as teacher data when receiving an input of another instruction signal other than the instruction to switch the irradiation lamp.

18. A light distribution control system, comprising:

the light distribution control device according to claim 1;

the irradiation lamp;

a switching instruction input device for the driver to perform a switching operation of the irradiation lamp;

a driver state detector to detect a state of the driver; and an environment detector to detect an environment in which the host vehicle is placed.

19. A light distribution control method comprising:

receiving environment information indicating an environment in which a host vehicle is placed;

receiving an instruction from a driver of the host vehicle to switch an irradiation lamp of the host vehicle;

performing estimation of whether or not the driver has an intention to switch the irradiation lamp on a basis of an action of the driver;

switching the irradiation lamp of the host vehicle on a basis of the environment information; and learning a driving scene in which the irradiation lamp of the host vehicle is to be switched by using the received environment at a second time point at which the intention is estimated to be present, the second time point being prior to a first time point at which the instruction is received.

* * * * *